(12) United States Patent
Binger et al.

(10) Patent No.: US 11,789,747 B2
(45) Date of Patent: *Oct. 17, 2023

(54) SIMULATED VISUAL HIERARCHY WHILE FACILITATING CROSS-EXTENSION COMMUNICATION

(71) Applicant: Microsoft Technology Licensing, LLC, Redmond, WA (US)

(72) Inventors: Julia Margaret Binger, Seattle, WA (US); Timothy Daniel Barber, Snohomish, WA (US); Masato Maeda, Sammamish, WA (US); Matthew James Wilson, Duvall, WA (US); Rayman Faruk Aeron, Bothell, WA (US); Amber Tianqi Guo, Seattle, WA (US); Shanmugha Priya Satheesh, Redmond, WA (US); Benjamin M Schultz, Bellevue, WA (US); Jyotirmaya Tripathi, Sammamish, WA (US); Jong Gyu Lee, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,866

(22) Filed: Dec. 27, 2021

(65) Prior Publication Data

US 2022/0156088 A1 May 19, 2022

Related U.S. Application Data

(63) Continuation of application No. 16/775,264, filed on Jan. 28, 2020, now Pat. No. 11,210,106.

(51) Int. Cl.
*G06F 3/0483* (2013.01)
*G06F 9/445* (2018.01)
(Continued)

(52) U.S. Cl.
CPC ............ *G06F 9/445* (2013.01); *G06F 3/0483* (2013.01); *G06F 3/04845* (2013.01);
(Continued)

(58) Field of Classification Search
CPC ........ G06F 9/445; G06F 9/547; G06F 16/986; G06F 3/0483; G06F 3/04845; G06F 3/04855
See application file for complete search history.

(56) References Cited

U.S. PATENT DOCUMENTS

| | | | |
|---|---|---|---|
| 2012/0054596 A1* | 3/2012 | Kroger | G06F 40/106 715/234 |
| 2013/0046855 A1* | 2/2013 | Jiang | H04L 67/10 709/218 |
| 2019/0018830 A1* | 1/2019 | Mou | G06F 16/986 |

OTHER PUBLICATIONS

Lukasz Krawiec et al., Validation of website accessibility—a case study of DIMBI project, Jun. 1, 2017, ECAI 2017—International Conference—9th Edition Electronics, Computers and Artificial Intelligent, pp. 1-6 (Year: 2017).*

(Continued)

*Primary Examiner* — Tam T Tran

(57) ABSTRACT

To provide a hierarchical visual paradigm while maintaining the communication advantages of sibling extensions, a visual hierarchy simulation extension generates and maintains placeholders in a visually hierarchical manner, with the visual positioning of such placeholders informing the visual positioning of overlays of frames hosting the visual output of sibling extensions. Such a visual hierarchy simulation extension is utilized to layout and establish a desired visual hierarchy. One or more modules of computer-executable instructions are invoked to provide the relevant functionality, including the obtaining of the visual positioning of placeholders, the relevant visual translation between the visual positioning of placeholders and the visual overlaying (Continued)

of corresponding frames, the generation and movement of the corresponding frames, and the instantiation of extension content within the corresponding frames. The visual hierarchy simulation extension is hosted independently from the one or more modules.

19 Claims, 12 Drawing Sheets

(51) Int. Cl.
*G06F 16/958* (2019.01)
*G06F 3/04845* (2022.01)
*G06F 3/04855* (2022.01)
*G06F 9/54* (2006.01)

(52) U.S. Cl.
CPC .......... *G06F 3/04855* (2013.01); *G06F 9/547* (2013.01); *G06F 16/986* (2019.01)

(56) References Cited

OTHER PUBLICATIONS

Mohammad Bajammal et al., Generating Reusable Web Components from Mockups, Sep. 1, 2018, IEEE Xplore, pp. 601-611 (Year: 2018).*

* cited by examiner

SIMULATED VISUAL HIERARCHY WHILE FACILITATING CROSS-EXTENSION COMMUNICATION

CROSS-REFERENCE TO RELATED APPLICATION

This application is a continuation of, and claims priority to, U.S. patent application Ser. No. 16/775,264, issued as U.S. Pat. No. 11,210,106, filed on Jan. 28, 2020, and entitled "SIMULATED VISUAL HIERARCHY WHILE FACILITATING CROSS-EXTENSION COMMUNICATION", the specification of which is hereby incorporated by reference in its entirety for all that it teaches and suggests.

BACKGROUND

Modern computer software application development, for applications that will execute within a traditional desktop application context, is typically performed utilizing computer software development tools that provide for independence between two or more sets of computer-executable instructions. Such independence allows the overall traditional desktop application to continue to operate even when a subcomponent experiences a failure, thereby enabling a user to more gracefully restart the desktop application, or otherwise continue to utilize the desktop application. Modern desktop application software development tools provide for independent application domains, and other like mechanisms to isolate individual desktop applications, or components of a single common desktop application, from one another so that they do not affect each other, especially within the context of a failure of one preventing the proper operation of others. Although described within the context of desktop applications, analogous tools for providing code independence exist in mobile application development and other development contexts.

More recently, analogous mechanisms have also been developed for web-based application development contexts, such that, should the computer-executable instructions of one aspect a webpage fail, they have reduced negative impact on at least some of the other functionality provided by that web page. Such mechanisms provide for extensions that, in some implementations, are isolated from one another through frames or other like containers.

SUMMARY

To provide a hierarchical visual paradigm while maintaining the communication advantages of sibling extensions, implementations of a visual hierarchy simulation extension generate and maintain placeholders in a visually hierarchical manner, with the visual positioning of such placeholders informing the visual positioning of overlays of frames hosting the visual output of sibling extensions. In at least some of such implementations, a visual hierarchy simulation extension is utilized to layout and establish a desired visual hierarchy. One or more modules of computer-executable instructions of any of these implementations, when invoked, provide the relevant functionality, including the obtaining of the visual positioning of placeholders, the relevant visual translation between the visual positioning of placeholders and the visual overlaying of corresponding frames, the generation and movement of the corresponding frames, and the instantiation of extension content within the corresponding frames. The visual hierarchy simulation extension is, in some instances, hosted independently from the one or more modules, enabling a single developer to provide the implementation of the relevant functionality, while facilitating its utilization by multiple other developers to establish visual layouts of their web-based applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
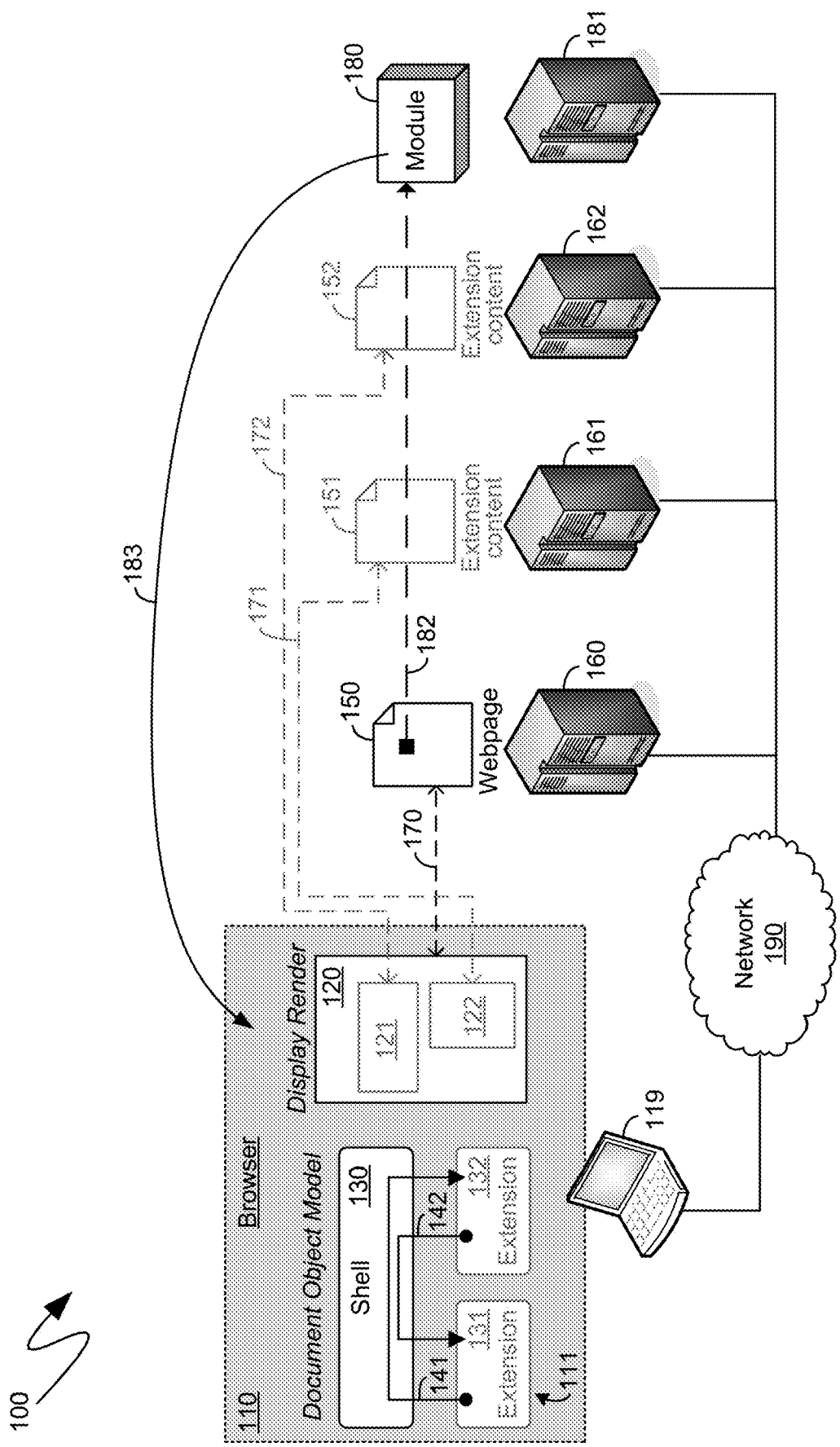
FIG. 1 is a system diagram of an exemplary system for utilizing a visual hierarchy simulation extension.

The following description relates to enabling hierarchical visual paradigms among extensions while maintaining the substantially simpler, more efficient, and more robust communications between sibling extensions. To provide a hierarchical visual paradigm while maintaining the communication advantages of sibling extensions, a visual hierarchy simulation extension generates and maintains placeholders in a visually hierarchical manner, with the visual positioning of such placeholders informing the visual positioning of overlays of frames hosting the visual output of sibling extensions. Such a visual hierarchy simulation extension is utilized, in some instances, to layout and establish a desired visual hierarchy. One or more modules of computer-executable instructions are invokable to provide the relevant functionality, including the obtaining of the visual positioning of placeholders, the relevant visual translation between the visual positioning of placeholders and the visual overlaying of corresponding frames, the generation and movement of the corresponding frames, and the instantiation of extension content within the corresponding frames. The visual hierarchy simulation extension is, in some instances, hosted independently from the one or more modules, enabling a single developer to provide the implementation of the relevant functionality, while facilitating its utilization by multiple other developers to establish visual layouts of their web-based applications. The hierarchical visual paradigm contains one or more placeholders and one or more visual overlays to implement a composite view to, for example, present data from multiple sources in one location, or to illustrate a diagram from multiple sources in one location. In some instances, a size, shape and location of an overlaid frame depends on a size, shape and location of a corresponding placeholder, but need not necessarily be identical thereto.

Communication between extensions is substantially simpler, more efficient, and more robust if the extensions are at the same hierarchical level. In other words, if a child extension is executing within a parent extension's context, communications between that child extension and extensions that execute as siblings of the parent extension are less efficient, less robust, and substantially more complex and prone to failure than communications between sibling extensions. Accordingly, it is desirable that extensions be instantiated as siblings of one another.

Unfortunately, extensions that are instantiated as siblings of one another cannot follow a hierarchical visual paradigm. For example, the visual output, or visual rendering, of one extension are unaffected by the visual output, or visual rendering, of another, sibling extension. Thus, if the latter is resized or scrolled, the former will remain visually unchanged. In some instances, however, it is beneficial for the visual output of one extension to appear as if it is within, or a child of, the visual output of another extension. For example, in some instances it is beneficial for the visual output of one extension to appear to scroll with, be resized with, and otherwise be affected by visual modifications to the visual output of another extension.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms are also practicable in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 illustrates a browser application program 110 executing on a computing device 119 and displaying a webpage 150 in the form of a displayed webpage 120. The exemplary browser application program 110 in some implementations is a ubiquitous web browser application program, or in some implementations is an application program that is configured to obtain and render a webpage, such as the exemplary webpage 150. The exemplary webpage 150 in some implementations is stored on one or more computer readable media communicatively coupled to a computing device, such as the exemplary computing device 160, which acts as a host for the exemplary webpage 150. The displayed webpage 120, in some instances, comprises visual elements, and behaves and functions in a manner, defined by the webpage 150. The dashed arrow 170 indicates the correspondence between the webpage 150, as a file or other like data construct stored on a computer-readable storage medium of a hosting server, such as the exemplary server 160, and the displayed webpage 120 that is rendered by a browser application program, such as the exemplary browser 110.

For ease of reference and understanding the mechanisms described herein will be described within the context of webpages and web browsers that render such webpages. However, the mechanisms described are equally applicable to other contexts. Additionally, as utilized herein, the term "extension" means content, including data and instructions, provided in structured form such that an application, such as a web browser, capable of parsing and implementing such instructions, does so in a manner independent of the browser's consumption of other data and instructions, typically through the use of frames or other like container and/or isolation functionality. By way of a simple example, and with reference to ubiquitous web technologies, a hosting webpage displays another webpage within a frame, such as a frame established utilizing the <IFRAME> tag in the Hyper-Text Markup Language (HTML) structure of the hosting webpage. The functionality provided by the hosting webpage, and by the hosted webpage in the frame, are both be implemented by the way the browser parsing, executing or otherwise implementing the instructions provided by the two webpages, which, in some instances, references additional files or objects, including locally hosted and remotely hosted scripts and script files that are parsed and executed by the browser. The hosted webpage is, in some instances, an extension of the hosting webpage in that it provides functionality beyond that provided by the hosting webpage itself. Moreover, the hosted webpage is isolated from the hosting webpage such that, if the hosted webpage were to experience a failure, such as in the parsing or execution of its instructions, or in the accessing of data referenced thereby, such a failure avoids impacting the user's ability to interact with the hosting webpage, due, at least in part, to the isolation afforded by the rendering of the hosted webpage within a frame.

As indicated previously, the utilization of the above described extension paradigm enables web applications, or, more specifically, the functionality provided by a web browser application program, such as the exemplary web browser 110, when the web browser application program consumes one or more webpages, such as the exemplary webpage 150, to utilize the extensibility, isolation, and robustness of modularized and isolated computer-implemented functionality in an analogous manner to traditional desktop application programs, thereby enabling richer, more useful, and more robust web applications. Although the above example utilized only a single extension, modern web applications may utilize dozens or even hundreds of extensions.

Turning back to the exemplary system 100 of FIG. 1, the exemplary webpage 150 comprises data and instructions, either directly, or indirectly through references to external files, packages, modules or the like, that provide a web application when the webpage 150 is rendered by the browser 110. To that end, and as illustrated by the exemplary system 100 of FIG. 1, the exemplary webpage 150 references one or more extensions, such as the exemplary extensions corresponding to the extension content 151 and 152, which are hosted either by the same computing device 160 hosting the webpage 150, or by other computing devices that, in some instances, are part of different domains, such as, for example, the exemplary computing devices 161 and 162, which are part of one or more different domains than the exemplary computing device 160. To utilize the functionality provided by such extensions, the exemplary webpage 150 comprises references, such as pointers, to the exemplary extension content 151 and 152. Subsequently, when a browser, such as the exemplary browser 110, downloads the webpage 150, the content of the webpage 150, including such references, are parsed by the browser 110 and a visual presentation 120 of the webpage 150 is generated. The visual presentation 120 includes visual aspects that are provided by the extensions referenced by the exemplary webpage 150, such as the exemplary visual aspects 121 and 122. As illustrated in FIG. 1 by the dashed lines 171, the exemplary visual content 121 is rendered by the browser 110 based on the extension content 151. Similarly, the dashed lines 172 are meant to illustrate that the exemplary visual content 122 is rendered by the browser 110 based on the extension content 152. As indicated previously, for isolation and other purposes, the exemplary extension content 151 and 152 is parsed and executed in a frame, which, in some instances, includes a visual delineation whereby the exemplary extension content 151 displays within the visual frame 121 and the exemplary extension content 152 displays within the visual frame 122.

In parsing a webpage, such as the exemplary webpage 150, a browser, such as the exemplary browser 111, creates a document object model, such as the exemplary document object model 111, from data and/or instructions of the webpage 150, including data and/or instructions that are included directly within the webpage 150, and data and/or instructions that are external to the webpage 150 and are identified, or otherwise referenced, by the content of the webpage 150 such that the browser 110, in parsing the webpage 150, obtains such separately sourced data and/or instructions. As indicated previously, extensions exchange messages, while maintaining isolation from one another. For example, the exemplary system 100 of FIG. 1 illustrates the exemplary extension 131, in the form of an extension object that is part of the document object model 111, transmitting a message 141 to the exemplary extension 132, in the form of an extension object it can also be part of the document object model 111. Correspondingly, the returned message 142 is likewise illustrated. The exemplary extension 132 corresponds to the extension content 152 and is an object model representation of the extension content 152. Analogously, the exemplary extension 131 corresponds to the extension content 151 and is an object model representation of the extension content 151. In the exemplary system 100 of FIG. 1, The messages 141 and 142 are exchanged via the shell 130 which hosts the extensions 131 and 132.

According to one aspect, extensions, such as the extensions 131 and 132, utilizes so-called "POST messages" to communicate with one another, such as is illustrated by the messages 141 and 142. More specifically, an extension comprises code, such as script or other like computer-executable instructions, that, when parsed by the browser 110, communicates with the extension code of another extension via POST messages. To do so each extension establishes a remote procedure call manager. A communication from the extension code is provided to the RPC manager, which creates a channel object for transmitting such a message via the POST messages. The channel object comprises, in some instances, a sequence number stored in an indexing dictionary. Additionally, a handler is created to receive the corresponding response. The communication is then transmitted between RPC channel controllers of the communicating extensions, such as the exemplary extensions 131 and 132. The message is then be received and provided to a handler, which is an inbound request processor that has been preregistered in advance to process a particular request. A response is then be provided to the RPC channel controller of the responding extension for transmission back to the RPC channel controller of the receiving extension. Upon receipt by the RPC channel controller of the receiving extension, the response is provided to the previously registered handler and, optionally, to the extension code 501. Upon receipt of such a response, a corresponding channel object is resolved, such as based on the sequence number or other like indexing information, thereby indicating that a response was received to the original message. In such a manner, functionality analogous to Remote Procedure Call (RPC) functionality is provided utilizing POST message communication between extensions executing in frames in a webpage.

The communications between extensions is monitored, such as by a shell hosting the extensions, which, in some instances, implements and/or enforces one or more policies. The enforcement of policies includes, in some instances, the forwarding of messages to one or more other destinations, the dropping or deleting of messages, the updating of messages and the like. The enforcement of policies is based on policy definitions, access control lists (ACLs) and other like configuration enumerations. Such policies are defined by a website author, a server administrator, an extension developer, a hardware manufacturer, a browser or operating system developer and the like.

Figure 2:
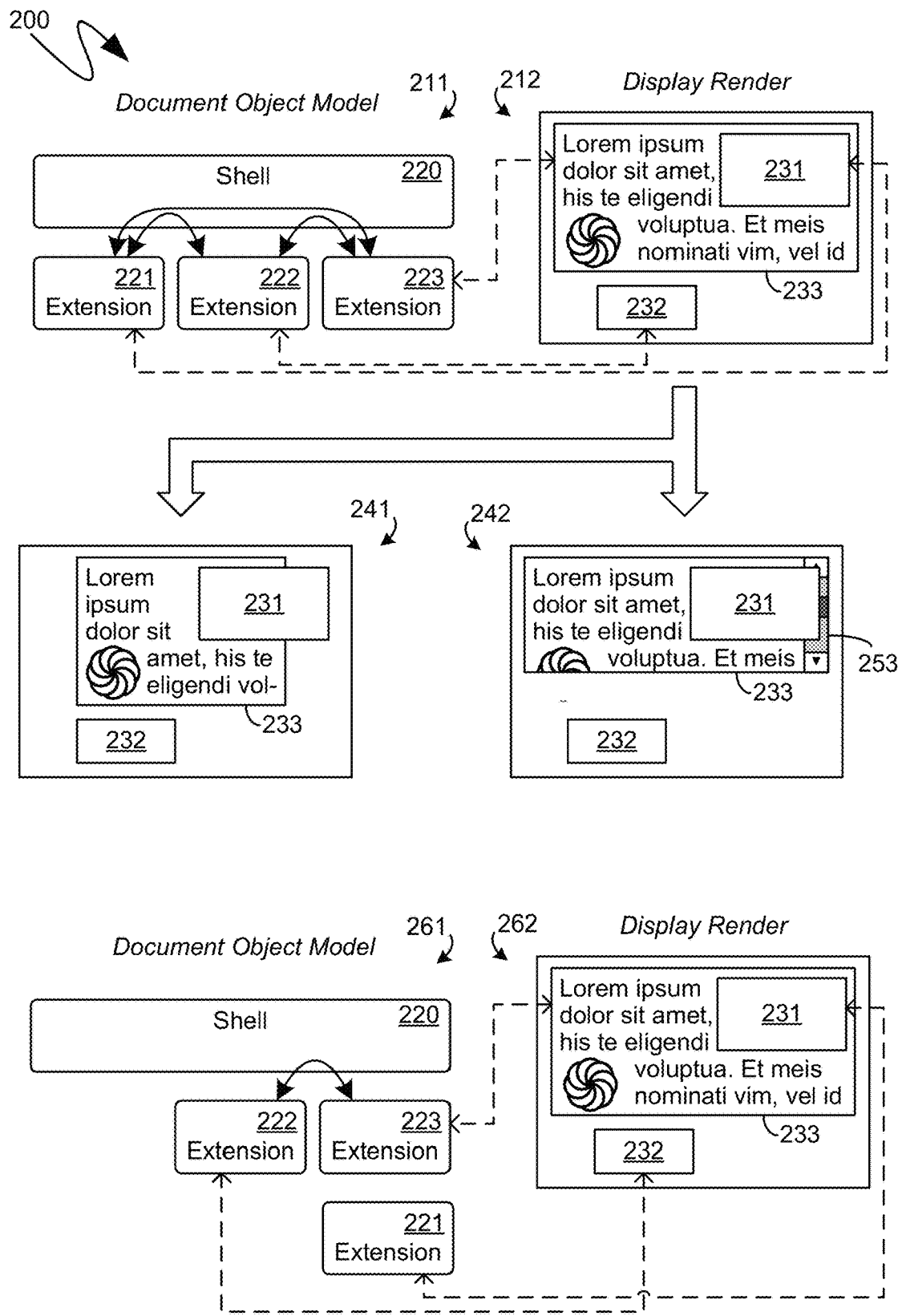
FIG. 2 is a system diagram of exemplary visual presentation limitations associated with extensions.

However, as indicated previously, such communications are substantially simplified, and are more robust and more efficient if they are between extensions at a same hierarchical level of the document object model. Extensions hosted at a same hierarchical level of the document object model, also referred to as "sibling" extensions, introduce limitations with respect to the visual paradigm that a webpage, or web application, utilizing such extensions present to users. For example, and with reference to exemplary system 200 shown in FIG. 2, an exemplary document object model 211 comprises three extensions, such as the exemplary extensions 221, 222 and 223, that are all at an equivalent hierarchical level and communicate with one another via messages, including via messages facilitated by, or passed through, the shell 220. Within the exemplary system 200 of FIG. 2, a display of an exemplary webpage utilizing the extensions 221 222 and 223 is illustrated in the display render portion 212. As illustrated by the dashed lines, the exemplary extension 221 generates content that is visually displayed within the exemplary frame 231, the exemplary extension 222 generates content that is visually displayed within the exemplary frame 232, and the exemplary extension 223 generates content that is visually displayed within the exemplary frame 233. Within the exemplary rendering 212, shown in FIG. 2, the content displayed within the exemplary frame 231 is visually illustrated as being part of the content that is displayed within the exemplary frame 233. For example, the content displayed within the frame 231 is, in some instances, related to, utilized by, or otherwise referenced by, the content displayed within the frame 233 such that, from a visual perspective, it is desirable for the contents displayed within the frame 231 to visually appear as if it is part of the content that is displayed within the frame 233. However, because the exemplary extensions 221, 222 and 223 are all siblings that are hosted at a same hierarchical level of the document object model 211, such a desirable visual paradigm may not be achievable.

For example, as illustrated by the exemplary rendering 241, if the frame 233 is resized, such a resize event can have no impact on the exemplary frame 231, since the extension 221, which is managing the display of the content in the frame 231, is being hosted as a sibling of the extension 223 that is managing the display of the content in the frame 233. Thus, as illustrated by the exemplary rendering 241, a resizing of the frame 233 leaves the frame 231 extending beyond the visual boundaries of the frame 233, thereby preventing the establishment of a visual paradigm that presents the frame 231 as content that is part of the frame 233. As another example, as illustrated by the exemplary rendering 242, if the frame 233 is resized such that a scrollbar appears, such as the exemplary scrollbar 253, the exemplary frame 231 can, again, remain unchanged since, as indicated, the extension 221, which is managing the display of the content in the frame 231, is being hosted as a sibling of the extension 223 that is managing the display of the content in the frame 233, and, as such, the content of the frame 231 is agnostic to the presentation of the scrollbar 253, and, thereby, overlaps it. Again, a visual paradigm that presents the frame 231 as content that is part of the frame 233 cannot be established.

The exemplary document object model 261 illustrates an alternative that presents its own drawbacks. More specifically, within the exemplary document object model 261, the extension 221, responsible for the content within the visual frame 231, is a child element of the extension 233, responsible for the content within the visual frame 233. As such, as part of the browser's normal operation, the visual frame 231 will be impacted by changes made to the size of the frame 233, scrolling within the frame 233, and other like visual impacts. Accordingly, a visual paradigm that presents the content of the frame 231 as part of the content of the frame 233 is achievable. However, communications between the extension 221 and the extension 222 are difficult, since the extension 222 is a sibling of the extension 223, but not the extension 221. Instead, communications between the extension 222 in the extension 221 may now require substantially more complex mechanisms that are less robust, meaningfully slower, more prone to failures or errors, and otherwise less efficient.

Accordingly, and turning back to the exemplary system 100 of FIG. 1, a set of instructions that are understandable by, and control the operation of the browser 110, are provided that accurately visually simulate a visual hierarchy of elements while allowing the extensions controlling the visual presentation within such elements to all remain siblings of one another, thereby facilitating improved communications between them. As utilized herein, the term "computer-executable instructions" includes instructions in a compiled form that is directly executable by one or more processing units of the computing device, instructions in a structured form that need to be compiled prior to being directly executed by one or more processing units of the computing device, as well as instructions that are interpreted in real time and then directly executed by one or more processing units of the computing device. Instructions that are interpreted in real time include script-based instructions such as JavaScript™ and other like script-based instructions. Utilizing such a definition, one or more modules of computer executable instructions, such as the exemplary module 180, are consumed by a browser application, such as the exemplary browser 110, and enable the browser to provide functionality that is invoked by the webpage 150 to implement a simulated visual hierarchical arrangement while allowing the extensions controlling the visual presentation to all remain siblings of one another. In such a manner, the webpage 150 need only comprise a reference, such as a pointer, invocation, or other like reference, to the module 180, graphically illustrated in the exemplary system 100 of FIG. 1 by the dashed lines 182. A browser parsing the webpage 150 then obtains the module 180, such as from the exemplary computing device 181, as illustrated by the communication 183. In such a manner, the module 180 is provided from a domain that is separate and independent of the domain of the computing device 160 hosting the webpage 150, as well as the one or more domains of the computing devices 161 and 162 hosting the extension content 151 and 152, respectively.

Figure 3:
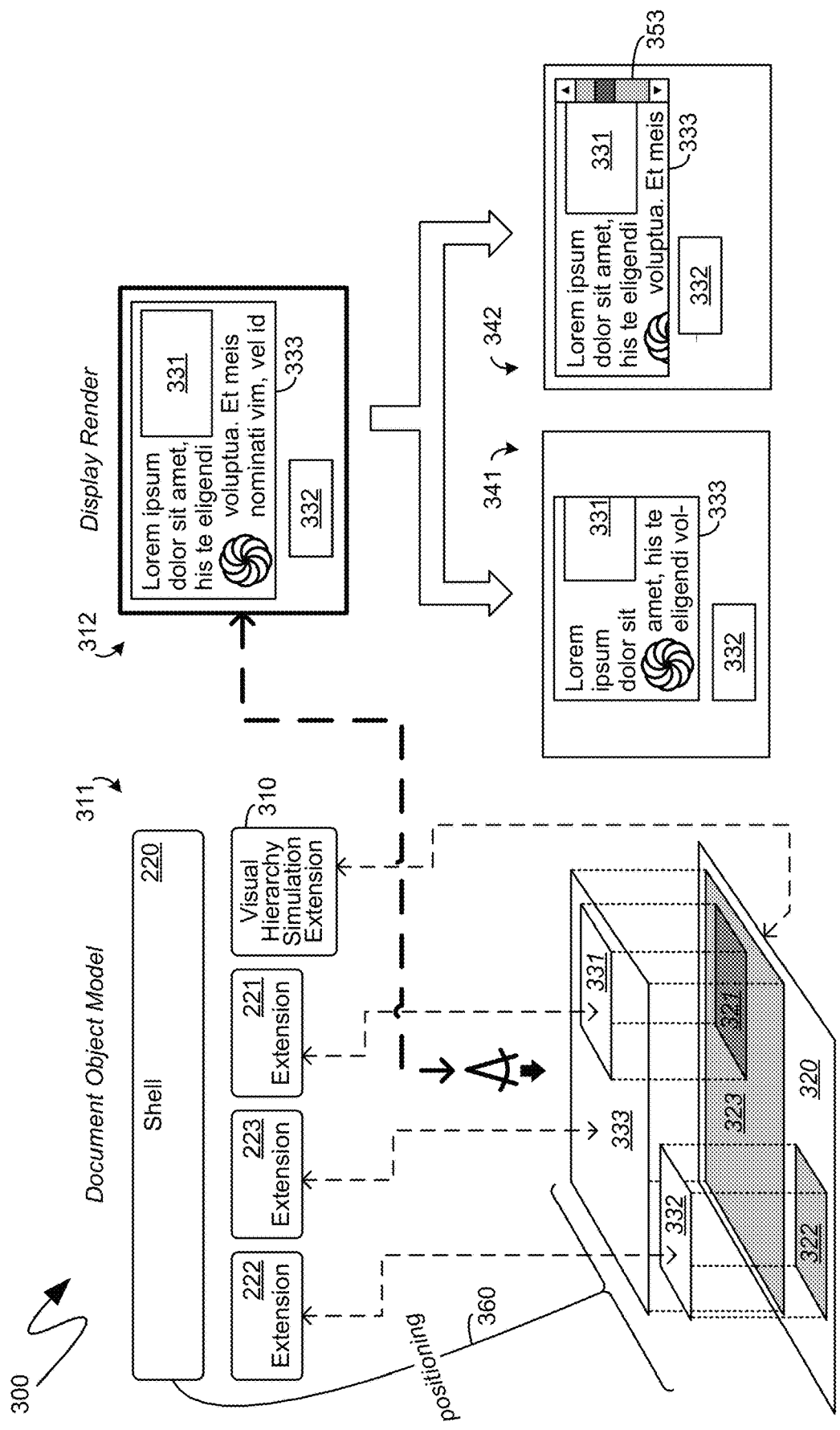
FIG. 3 is a system diagram of an exemplary system comprising a visual hierarchy simulation extension.

Turning to FIG. 3, the exemplary system 300 shown therein illustrates an exemplary mechanism by which a visual hierarchical arrangement is simulated while allowing extensions controlling the visual presentation to all remaining siblings of one another. According to one aspect, functionality is provided within an extension that is at the same hierarchical level as the other extensions. According to another aspect, the described functionality is wholly implemented in the shell 220. In some instances, implementation utilizing a visual hierarchy simulation extension, such as the exemplary visual hierarchy simulation extension 310, is preferable for extensibility and distributed development purposes and, accordingly, the descriptions below will be provided in such a context.

As illustrated by the exemplary system 300 shown in FIG. 3, an exemplary document object model 311 of a webpage comprises multiple extensions, such as the aforementioned extensions 221, 222 and 223 (whose order left-to-right is changed in FIG. 3 for diagrammatic simplicity in routing the dashed lines). As indicated previously, the extensions 221, 222 and 223 are at a same hierarchical level, and are siblings of one another, thereby facilitating communication between them. As also indicated previously, each of the extensions 221, 222 and 223 cause the browser to generate visual output within visually defined boundaries, such as frames established by the browser. Such frames are in accordance with utilization of the <IFRAME> HTML tag, or other like frame structures. To facilitate communication and understanding of some of the benefits afforded by the mechanisms described herein, the exemplary extensions 221, 222 and 223 are equivalent to those detailed above with reference to FIG. 2 and it is desirable for the extensions 221, 222 and 223 to be part of the visual paradigm that visually seeks to establish output of the extension 221 as part of the output of the extension 223. While existing mechanisms resulted in the problems detailed above with reference to FIG. 2, in the exemplary system 300 of FIG. 3, the visual hierarchy simulation extension 310 facilitates the simulation of such a hierarchical visual paradigm.

More specifically, and as illustrated by the exemplary system 300 of FIG. 3, the exemplary visual hierarchy simulation extension 310 corresponds to a frame, such as the exemplary frame 320. For example, the visual hierarchy simulation extension 310 is an instantiation of HTML structure and JavaScript™ code, such as is part of a webpage that is hosted separately from the extensions 221, 222 and 223, and that is also be listed separately from a webpage invoking the visual hierarchy simulation extension 310. Within the exemplary frame 320, the visual hierarchy simulation extension 310 establishes placeholders, such as the exemplary placeholders 321, 322 and 323. For example, the HTML structure of the visual hierarchy simulation extension 310 arranges HTML tags that, in some instances, cause the creation and management of such placeholders, such as will be detailed further below. According to one aspect, the arrangement of placeholders by the visual hierarchy simulation extension 310 corresponds, in some instances, to the visual hierarchy that is desired. For example, the exemplary placeholder 321 is defined, by the structure of the webpage corresponding to the visual hierarchy simulation extension 310, to be a visually hierarchical sub element of the exemplary placeholder 323.

The extensions 221, 222 and 223 also generate content in frames, such as the exemplary frames 331, 332 and 333. As detailed above with reference to FIG. 2, however, because the extensions 221, 222 and 223 are all at a same hierarchical level, the visual appearance of any one of the frames 331, 332 and 333, without more, is unaffected by the visual appearance of any of the other frames. In an analogous manner, the exemplary frame 320 can also be unaffected by the visual appearance of any of the frames 331, 332 and 333, since the visual hierarchy simulation extension 310 is at the same hierarchical level as the extensions 221, 222 and 223.

The exemplary placeholders 321, 322 and 323, since they are hierarchically arranged structures, with their hierarchical arrangement being specified by the HTML structure of the webpage corresponding to the visual hierarchy simulation extension 310, their visual arrangement conforms to known hierarchical visual paradigms. For example, if the placeholder 323 were to be resized, or scrolled, the placeholder 321 would be moved, cut off, or otherwise appropriately visually modified in the same manner as any hierarchical child of the placeholder 323. Stated differently, the document object model of the webpage that provides the visual hierarchy simulation extension 310 comprises a hierarchy where the document object model element corresponding to the placeholder 321 is a child of the document object model element corresponding to the placeholder 323. Thus, so long as the HTML structure of the webpage that is instantiated into the visual hierarchy simulation extension 310 accurately establishes the hierarchy that is to be visually simulated, the resulting placeholder elements will conform to such a visual hierarchy in a standard manner.

According to one aspect, interactions between the exemplary visual hierarchy simulation extension 310 and the shell 220 results in the shell 220 positioning the frames 331, 332 and 333 so as to be overlaid over corresponding placeholders, namely the placeholders 321, 322 and 323, respectively. More specifically, once the frame 320 is laid out, such that the positioning of the placeholders 321, 322 and 323 is established in accordance with traditional document object model rendering, the visual hierarchy simulation extension 310 obtains the visual locations of the placeholders 321, 322 and 323. For example, such location is obtained utilizing the get bounding rectangle command, or other like commands. As will be recognized by those skilled in the art, such commands return location information of a specified target element. Such location information includes height and width values, coordinate values specifying the distance of edges of a shape from a specific reference, such as the top-left of the viewport and other like location information. For the get bounding rectangle command, the returned information defines a rectangular shape, namely the smallest rectangle which contains the entire specified target element. Other commands return location information with reference to other shapes, boundaries and/or frames of reference. The visual hierarchy simulation extension 310 then provide the visual locations of the placeholders 321, 322 and 323, and other corresponding information, to the shell 220. Utilizing such information, the shell 220, in some instances, positions the frames 331, 332 and 333, into which content generated by the extensions 221, 222 and 223, respectively, is being rendered, so that the frames 331, 332 and 333 are positioned over the top of their corresponding placeholders 321, 322 and 323, respectively. Such a positioning action 360 is illustrated in the exemplary system 300 of FIG. 3. When viewed by a user, the display render 312 appears to the user as if the frame 331, for example, is a visual child element of the frame 333, such as is illustrated in FIG. 3.

The exemplary display render 341 illustrates an exemplary response to a resizing of the frame 333. More specifically, the placeholder 323 is resized, such as due to a more limited display area being granted to the browser, or other like resize-triggering events. In response, the browser, based on the document object model of the webpage that is instantiated into the visual hierarchy simulation extension 310, appropriately resizes the placeholder 321, since, within the document model object of that webpage, the placeholder 321 is at a lower hierarchical level to the placeholder 323, namely a child element of the placeholder 323. Once the placeholders have been resized, the visual hierarchy simulation extension 310 again obtain their visual position, and again provide such information to the shell 220. In response, the shell 220 repositions the frames 331, 332 and 333 to, again, be visually overlaid over the placeholders 321, 322 and 323. Since the placeholders 321, 322 and 323 have changed size, such as, for example, the child placeholder 321 changing size due to the parent placeholder 323 being resized, the shell 220 appropriately resizes the corresponding frames 331, 332 and 333 when performing the positioning 360. From the perspective of the user, as illustrated in the exemplary display render 341, the content within the frame 331 has been clipped by what appears to be the resizing of the frame 333. In other words, even though the frames 331, 332 and 333 are at a same hierarchical level in the document object model 311, since the extensions rendering the content in such frames, namely the extensions 221, 222 and 223, respectively, are at a same hierarchical level, the resizing of the frames 331, 332 and 333 by the shell 220 in performing the positioning 360 creates a visual appearance as if the frame 331 is a child of the frame 333.

As another example, the exemplary display render 342 illustrates an exemplary response to resizing of the frame 333 that results in the presentation of a scrollbar, such as the exemplary scrollbar 353. Again, such a resizing is triggered by resize-triggering events impacting the document object model of the frame 320 which, in some instances, results in the placeholders, such as the exemplary placeholder 323, being resized. Since, within the document object model of the frame 320, which corresponds to the webpage that is instantiated into the visual hierarchy simulation extension 310, the placeholder 321 is a sub-element to the placeholder 323, then the existence of a scrollbar being displayed as part of the placeholder 323 will impact the visual size and visual location of the placeholder 321. Subsequently, when the visual hierarchy simulation extension 310 communicates with the shell 220 to trigger the positioning 360, the visual size and visual location of the placeholder 321 provided by the visual hierarchy simulation extension 310 to the shell 220 will delineate the visual size and visual location of the corresponding frame 331 that the shell 220 overlays over the placeholder 321 as part of the positioning 360. From the perspective of the user, however, the frame 321 visually appears as if it is a child element to the frame 333, such as is illustrated by the exemplary display render 342.

Figure 4A:
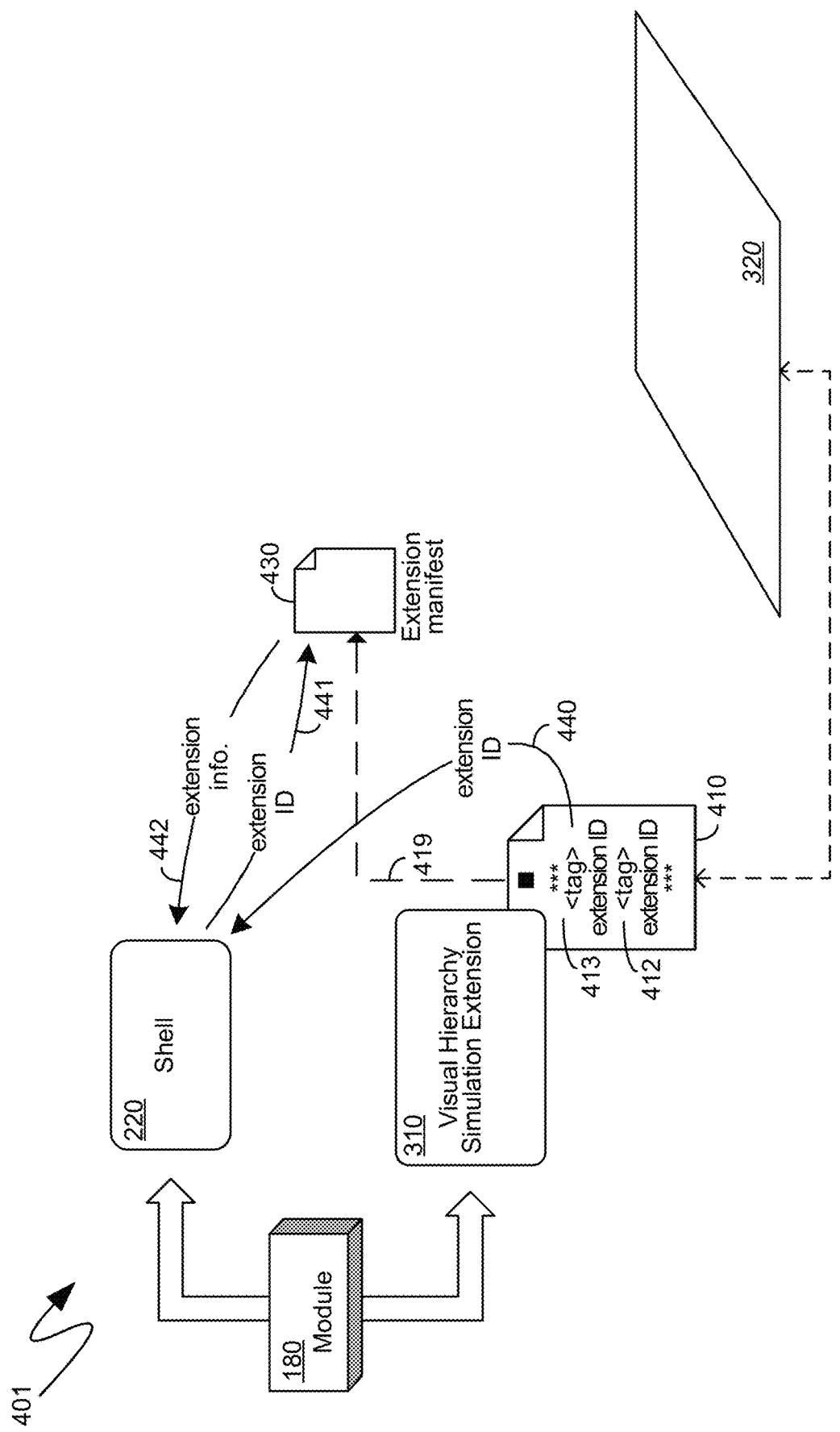
FIGS. 4a-e are system diagrams of an exemplary implementation of a visual hierarchy simulation extension.

The operation of the above-described mechanisms is provided in greater detail with reference to FIGS. 4a-4e. Turning to FIG. 4a, the exemplary system 401 shown therein illustrates an exemplary initial actions performed by a browser application to implement the above-described mechanisms. More specifically, a webpage, such as the exemplary webpage 410, utilizes tags, such as the exemplary tags 412 and 413, to specify, within the context of the layout of the page 410, arrangements of placeholders, such as the exemplary placeholders described above. The exemplary webpage 410 also comprises a reference to the module 180 which comprises computer-executable instructions that are performed by the browser to implement the functionality described herein. For example, the tags 412 and 413 are a specific type of tag that invokes functionality provided by the module 180. As part of the utilization of the tags 412 and 413, certain information is specified within the text of the webpage 410. One such information specified is an identifier of an extension whose frame is to be visually positioned in accordance with the placeholder being established by the tag. Other information, as will be detailed further below, includes information relevant to the receiving of input by the specified extension, and the provision of output by the specified extension. While such information may not directly impact the visual arrangements, in some instances they provide a convenient mechanism by which extensions exchange communications, receive input, and provide output.

According to one aspect, an extension identifier is based on information provided in an extension manifest, such as the exemplary extension manifest 430. More specifically, the webpage 410 comprises a reference, graphically illustrated by the dashed lines 419, to extension content that comprises the extension manifest 430. For example, the webpage 410 comprises a Uniform Resource Identifier (URI) identifying a domain and/or computing device hosting extension content, such as the exemplary computing device 161 hosting the extension content 151, shown in FIG. 1. The extension content includes, not only a webpage comprising data and/or instructions that will direct the instantiation of the extension by the browser, but also an extension manifest, such as the exemplary extension manifest 430. Such an extension manifest is in the form of a JavaScript™ Object Notation (JSON) file, or other like data format. According to one aspect, an extension manifest conforms to a predefined format or schema. Such a schema includes fields relevant to the extension supporting the mechanisms described herein, including a field indicating whether the extension supports such mechanisms, a field defining the extension name, a field defining an identifier that is utilized with the tags 412 and 413 to identify the extension, a field specifying a path, or other location to the code and/or data that comprise the extension, and other like fields.

Upon retrieving the webpage 410, the browser generates the document object model of the page and render it within a frame, such as the exemplary frame 320. As indicated previously, the frame 320 is placed within a container webpage, or the mechanisms described herein are implemented within the context of a top-level container. For purposes of illustration, the exemplary system 401 of FIG. 4a is described within the context of a frame 320 that is invoked by an invoking, container webpage. Accordingly, either such an invoking, container webpage, or the webpage 410, references the module 180 such that the browser is instructed in accordance with the computer executable instructions of the module 180. Such instructions includes instructions for the implementation of the tags, such as the exemplary tags 412 and 413. The exemplary tags 412 and 413 are <DIV> tags that delineate sections of the webpage 410. The exemplary tags 412 and 413, alternatively, are custom-defined tags that invoke the instructions of the module 180 to guide the browser's processing of such tags.

The instructions of the module 180 are utilized by the browser to process the tags 412 and 413. Such instructions includes the provision of an extension identifier, identified by a tag, to the shell 220, as illustrated by the communication 440. Subsequently, the instructions of the module 180 is further be referenced by the browser as part of the implementation of the shell 220 and, the browser's execution of such instructions, as part of the implementation of the shell 220, causes the browser to utilize the extension identifier, provided by the communication 440, to obtain the extension manifest 430, as illustrated by the action 441, and obtain therefrom extension information 442. The obtained extension information includes a URI identifying the content of the extension corresponding to the placeholder that is being invoked by, for example, the tag 413.

Figure 4B:
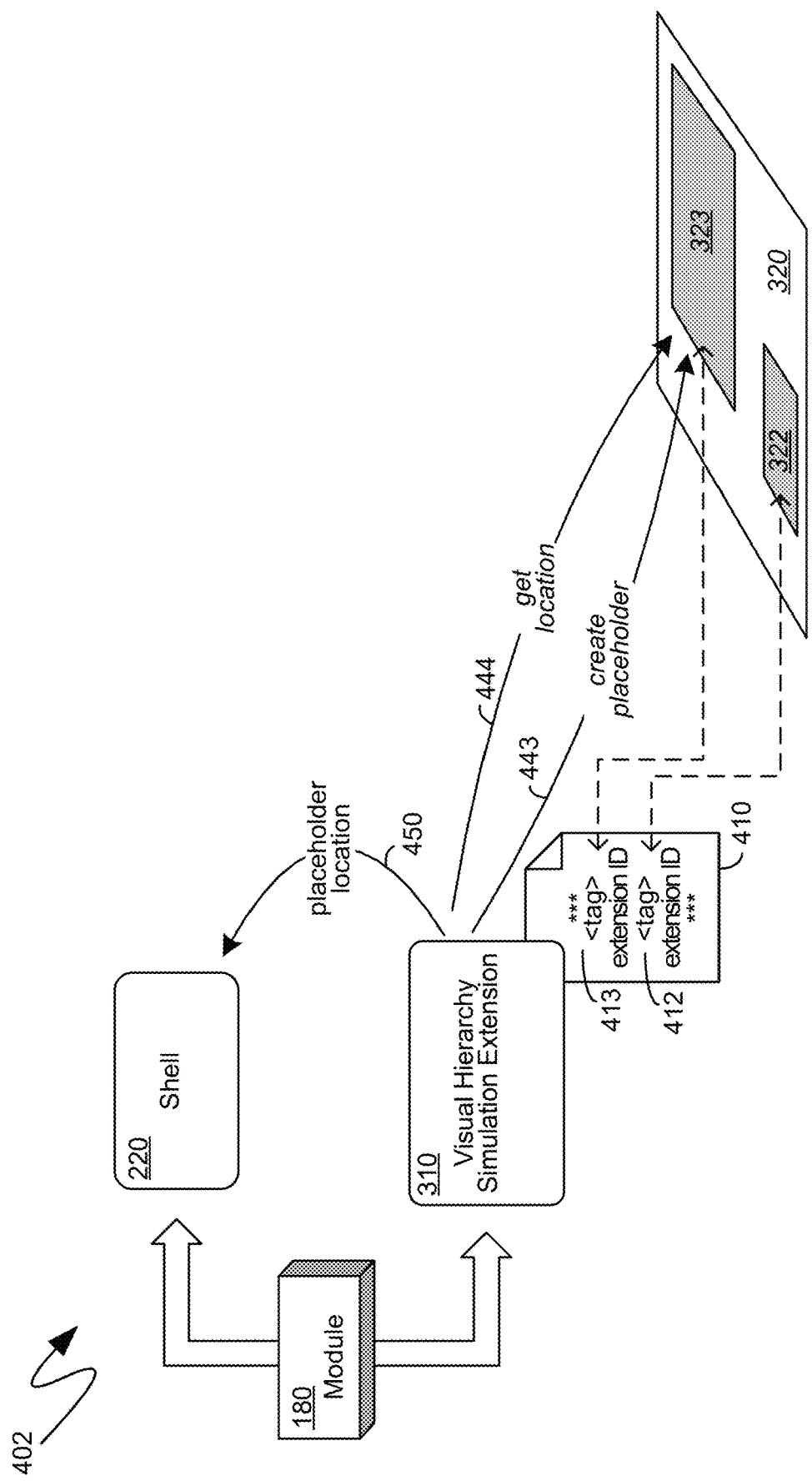

Turning to FIG. 4b, the exemplary system 402 shown therein illustrates subsequent operations informed by the code of the module 180. More specifically, the visual hierarchy simulation extension 310 creates a placeholder as part of the browser's rendering of the visual layout of the frame 320 in accordance with the document object model of the webpage 410. For example, the visual hierarchy simulation extension 310 creates the placeholder 323, as illustrated by the create placeholder action 443, as part of the browser's handling of the tag 413 in rendering the webpage 410, with such handling being informed by the module 180. A corresponding placeholder 322 is created corresponding to the tag 412. According to one aspect, an identifier of the placeholder 323 is generated. Alternatively, or in addition, identifications are performed utilizing the extension identifier and an identifier of a corresponding, overlaid frame, such as will be detailed further below.

In addition to the create placeholder action 442, the visual hierarchy simulation extension 310 also obtains a location of the placeholder 323 that was previously created. Such a get location action 444 utilizes known web browser functionality, such as the get bounding rectangle functionality detailed previously. As above, the performance of such steps, by the browser, is attributed to the visual hierarchy simulation extension 310, but is informed by the code of the module 180 referenced thereby.

Once the location of the placeholder 323 is obtained, the visual hierarchy simulation extension 310 provides such a placeholder location to the shell 220, as illustrated by the action 450. To identify which placeholder the provided location corresponds to, the visual hierarchy simulation extension 310 combines the provision of the placeholder location 450 with the previously described provision of the extension identifier 440. The shell 220, upon receiving both, recognizes that a new frame is to be created and positioned in accordance with the provided placeholder location, such as will be detailed further below. Alternatively, placeholder identifiers, or other like identification schemes are utilized.

Figure 4C:
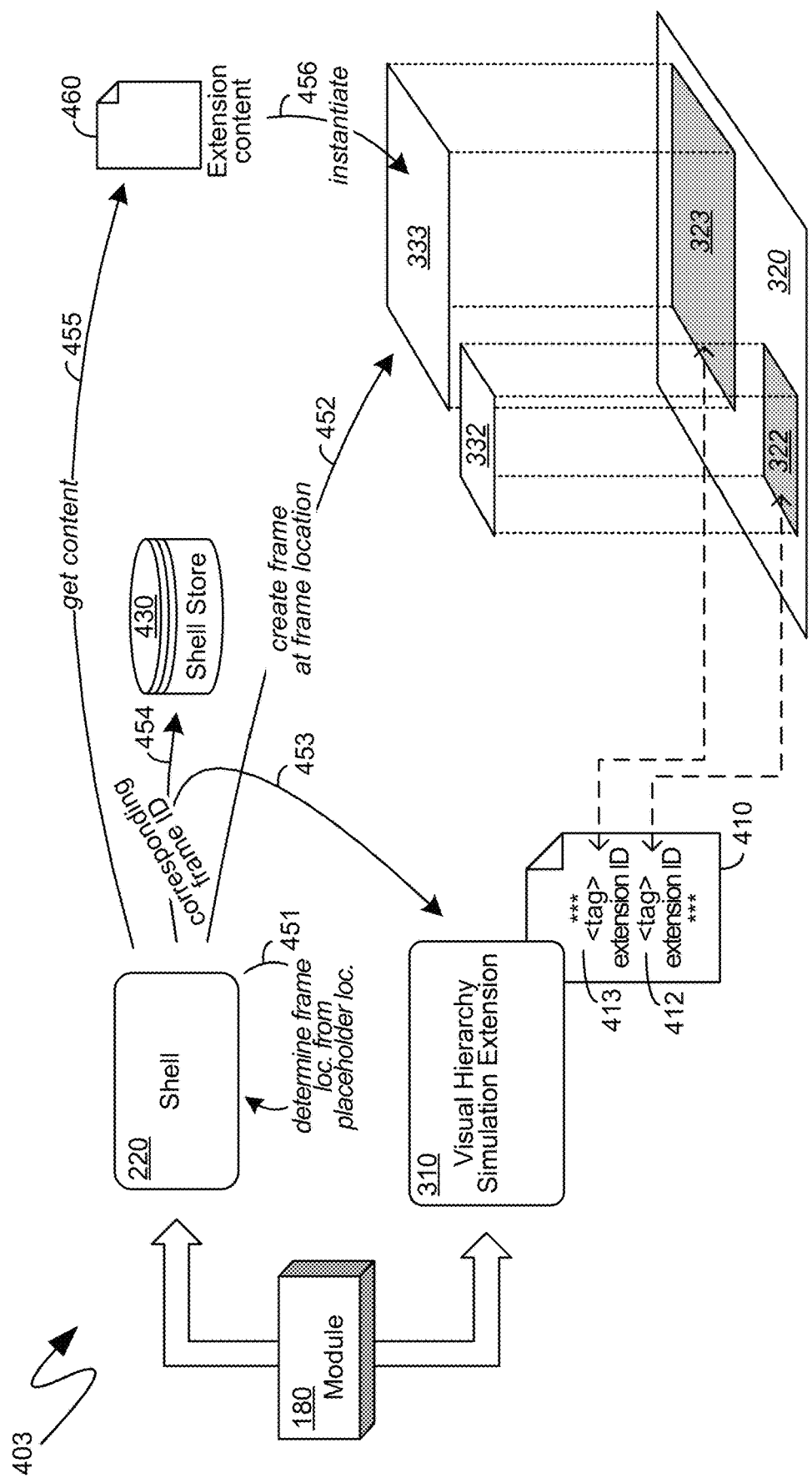

Turning to FIG. 4c, the exemplary system 403 shown therein illustrates a subsequent sequence of actions that are performed, including by the browser performing as instructed by the code the module 180. More specifically, upon receipt of the placeholder location 450, as shown in FIG. 4b, the shell 220 determines a frame location such that the frame would be visually overlaid on top of the placeholder. Such a frame location determination is illustrated by the action 451, which is conceptually associated with the shell 220, but the browser's performance thereof is informed by the code of the module 180. A determination of a frame location is as simple as utilizing the location coordinates of the placeholder 323 that were obtained by the visual hierarchy simulation extension 310 and provided as part of the action 450. As will be detailed further below, however, in some instances the frame 320 is offset within a containing webpage. Since, as indicated previously, the visual hierarchy simulation extension 310 is at a same hierarchical level as other extensions, such as extensions whose content will be rendered within the frames being overlaid over the placeholders of the visual hierarchy simulation extension 310, the positioning of those frames is specified, not with respect to the boundaries of the frame 320, but rather the boundaries of the containing webpage. Accordingly, as part of the determination of a frame location, such as represented by the action 451, the shell 220 takes into account a visual offset between the boundaries of the frame 320 and the boundaries of a containing webpage window.

Once the frame location is determined, as represented by the action 451, the shell 220 creates a frame at the determined frame location. The action 452 represents the creation of a frame 333 at such a location, with the frame 333 thereby being overlaid over the corresponding placeholder 323. The created frame 333 is assigned a frame identifier. According to one aspect, such a frame identifier, of the frame 333 corresponding to, and being overlaid over, the placeholder 323, is returned to the visual hierarchy simulation extension 310, as illustrated by the communication 453. The frame identifier for the corresponding frame is also retained by the shell 220, such as in a storage 430. The storage 430 is any collection of data maintained by the shell 220, such as a registry, and need not be persisted to disk or other like storage media. The frame identifier is stored with other extension information, as illustrated by the storage action 454.

Additionally, as indicated previously, the extension information obtained via the action 442, described above and illustrated in FIG. 4a, includes a URI, or other identifier from which a location of extension content, such as the exemplary extension content 460, is obtained. For example, the extension information identifies a Uniform Resource Locator (URL) that directly identifies the extension content 460. As another example, the extension information identifies a table that, in turn, identifies multiple different extension contents, with the specific extension content obtained by the shell 220 depending on variables, such as browser type, operating system type, display size, and other like information that is available to the shell 220 and that, in combination with the information provided by the table, is utilized to identify and select a specific extension content 460. As yet another example, the extension information identifies an intermediate location that, in turn, identifies the location of the extension content 460, allowing the location of the extension content 460, and, indeed, the extension content 460 itself, to be changed, or decided, at run-time. Once the extension content 460 is obtained by the shell 220, as illustrated by the action 455, such extension content is instantiated into the created frame 333 that is overlaid over the placeholder 323, as illustrated by the instantiate action 456. Although not specifically described, the positioning of the exemplary frame 332, and the instantiation of extension content into the frame 332 proceeds in an analogous manner.

Figure 4D:
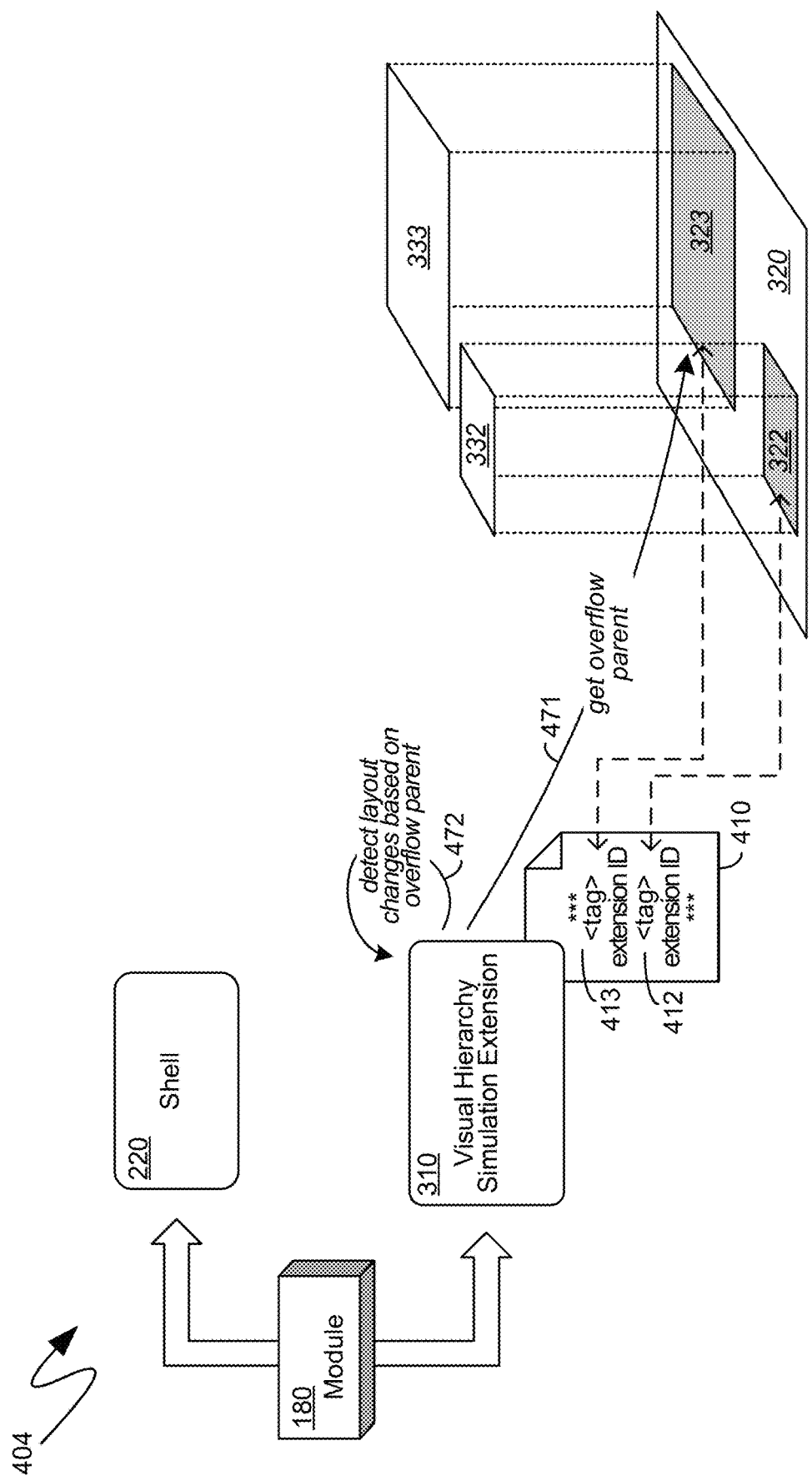

Turning to FIG. 4d, the exemplary system 404 shown therein illustrates additional functions that are performed as part of the simulation of a visual hierarchy. Such functions include the visual hierarchy simulation extension 310, utilizing the code of the module 180, to cause the browser to obtain parent overflow information of the placeholder element 323, as illustrated by the action 471. More specifically, the document object model of the webpage 410 can have multiple hierarchical levels and the placeholder elements are positioned at those multiple hierarchical levels. Thus, a placeholder element is at a hierarchical level below a parent element such that the placeholder element is a child to the parent element, and, as such, the manner in which a parent element handles overflow and whether a parent element's content is overflowing is relevant to the display of the child, which, in the present example, is the placeholder element. For example, overflow properties of elements, including placeholder elements, are set to, for example, clip content that falls outside the element, display content even if it falls outside the element, or display scrollbars to allow for scrolling to reach not displayed or clipped content falling outside the boundaries of an element. If the overflow properties indicate that the parent element will display scrollbars, in some instances an additional clipping of an overlaid frame needs to be determined, as will be detailed further below.

According to one aspect, one mechanism for determining whether there is overflow in a parent element comprises obtaining a scroll height of the parent element being evaluated, obtaining a client height of that same element and comparing the two. If the scroll height is larger, a determination is made that there is overflow. Analogously, a scroll width is obtained and compared to an obtained client width and if the scroll width is greater, a similar determination is made that there is overflow. For one or more parent elements of, for example, the placeholder element 323, including parent elements that are multiple hierarchical levels above the placeholder element 323, the action 481, in such a manner, obtains overflow information for one or more of those parent elements. For example, the obtain overflow action obtains the overflow information of the hierarchically nearest parent element having a specified overflow property. Subsequently, the visual hierarchy simulation extension 310 monitors, based on the obtained overflow information, visual changes to one or more parent elements that, in some instances, visually impact the placeholder element 323, including the resizing of parent elements, and the scrolling of parent elements, of the obtained overflow information indicate that such parents support scrolling. Such targeted monitoring is performed on a per element basis, with the monitoring being performed for the placeholder element 323 differing from the monitoring being performed for the placeholder element 322, since the two elements can have different parents, and such parents can have different overflow properties. The targeted monitoring is visually represented by the action 472 in FIG. 4d.

Figure 4E:
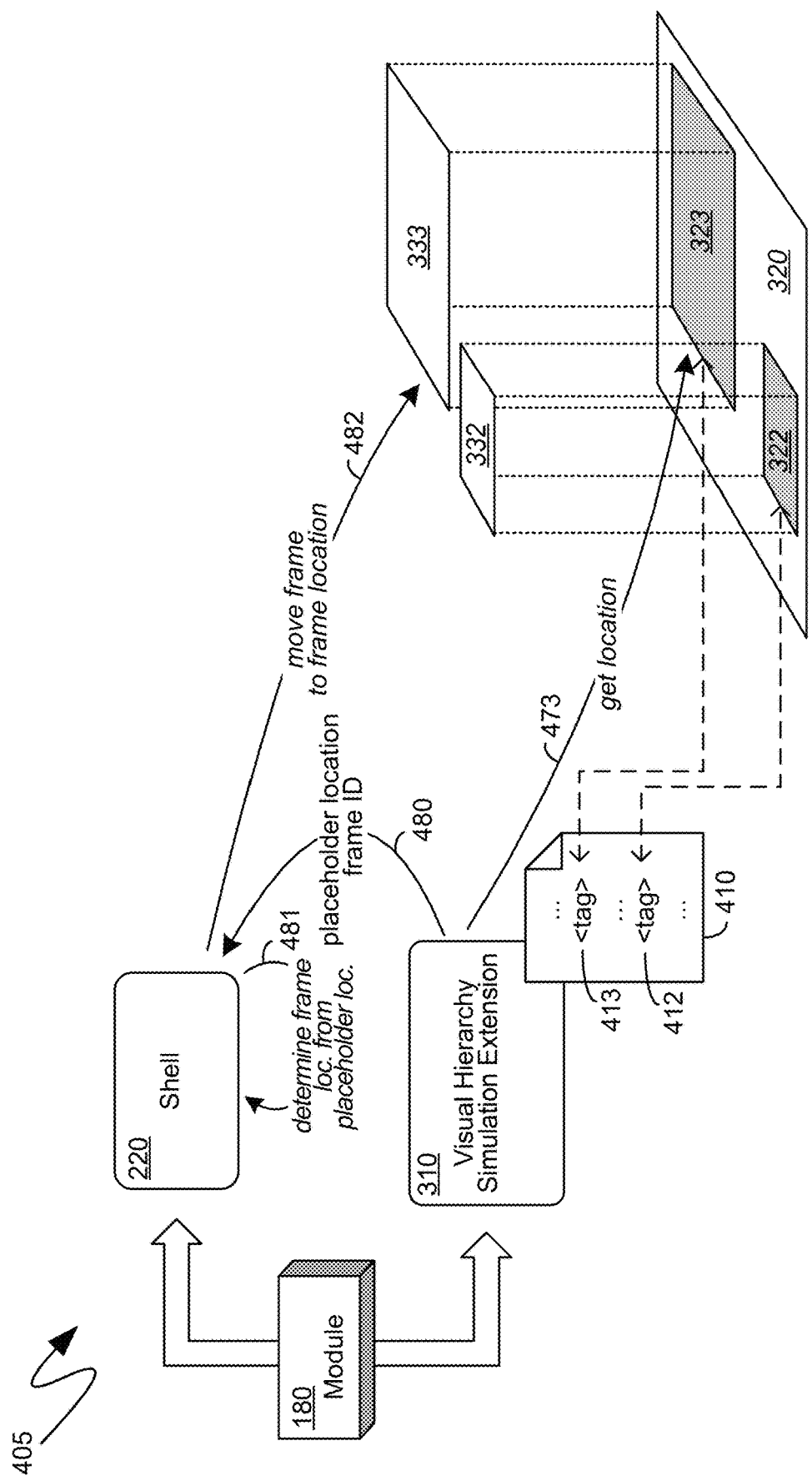

Turning to FIG. 4e, the exemplary system 405 shown therein illustrates an exemplary series of steps that are performed if the monitoring represented by the action 482 of FIG. 4d detects a change to the visual size or representation of the placeholder element 323. In such an event, an updated location of the placeholder element 323 is obtained by the visual hierarchy simulation extension 310, as illustrated by the action 473. Subsequently, in a manner analogous to that illustrated by the system 403 of FIG. 4c, and described in detail above, the visual hierarchy simulation extension 310 transmits a request 480 to the shell 220, providing the updated placeholder location, obtained by the action 473, and the identifier of the corresponding frame, such as was received after the corresponding frame was created and overlaid over the placeholder 323, and such as was graphically illustrated by the communication 453, shown in FIG. 4*c*. The shell 220, in the manner indicated previously, determine an updated frame location from the updated placeholder location information provided by the request 480, with such being graphically represented by the action 481, and moves the identified frame to the determined frame location, as illustrated by the action 482. In such a manner, the frame 333 visually responds in a manner that is visually evocative of a visual paradigm that comprises multiple hierarchical levels, even though the frame 333, the frame 332, the frame 320, and the like are all be associated with extensions that are executing at a same hierarchical level to facilitate the communications therebetween, as detailed above.

Figure 5A:
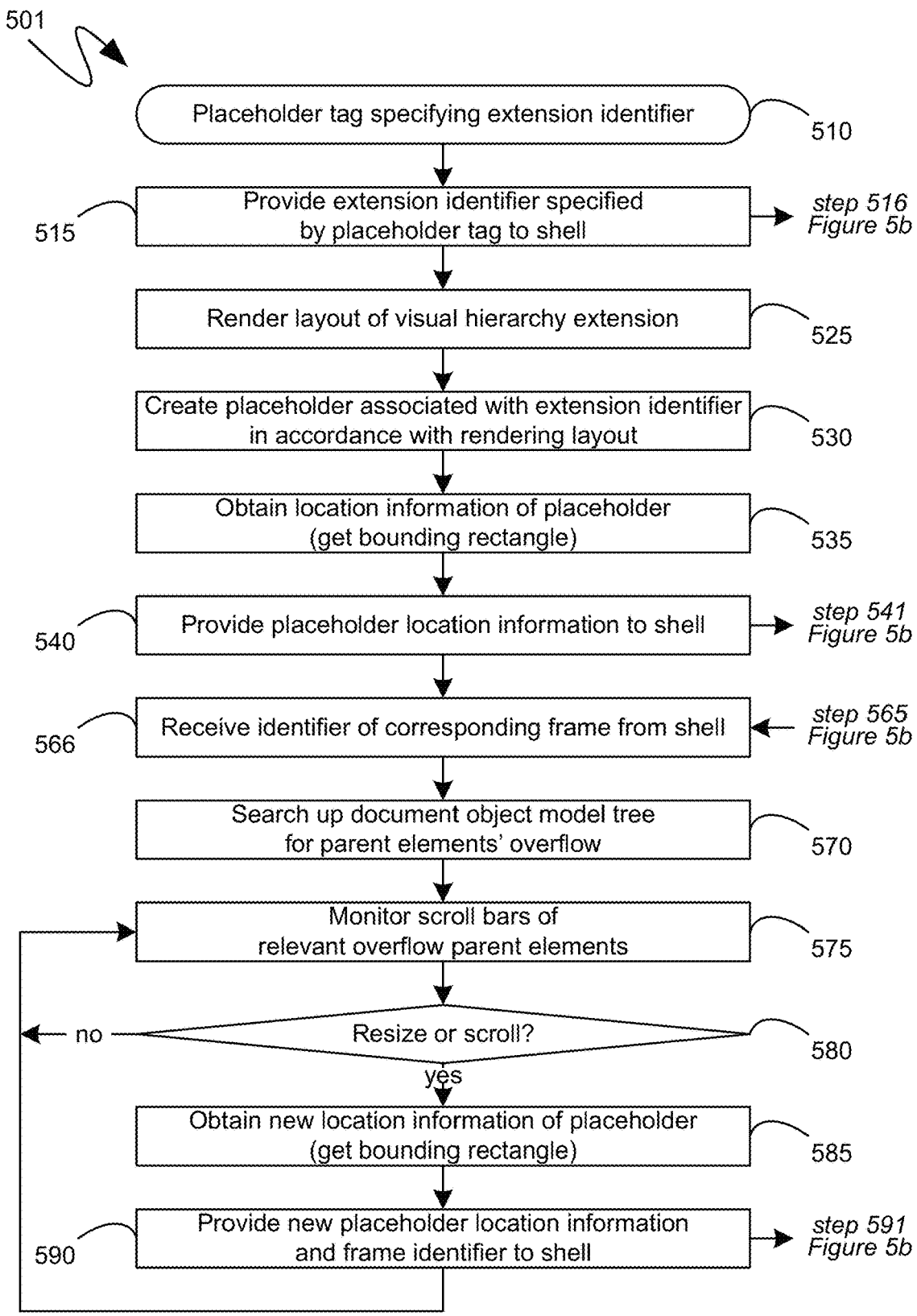
FIGS. 5a-b are flow diagrams of an exemplary series of steps for providing a visual hierarchy simulation.
Figure 5B:
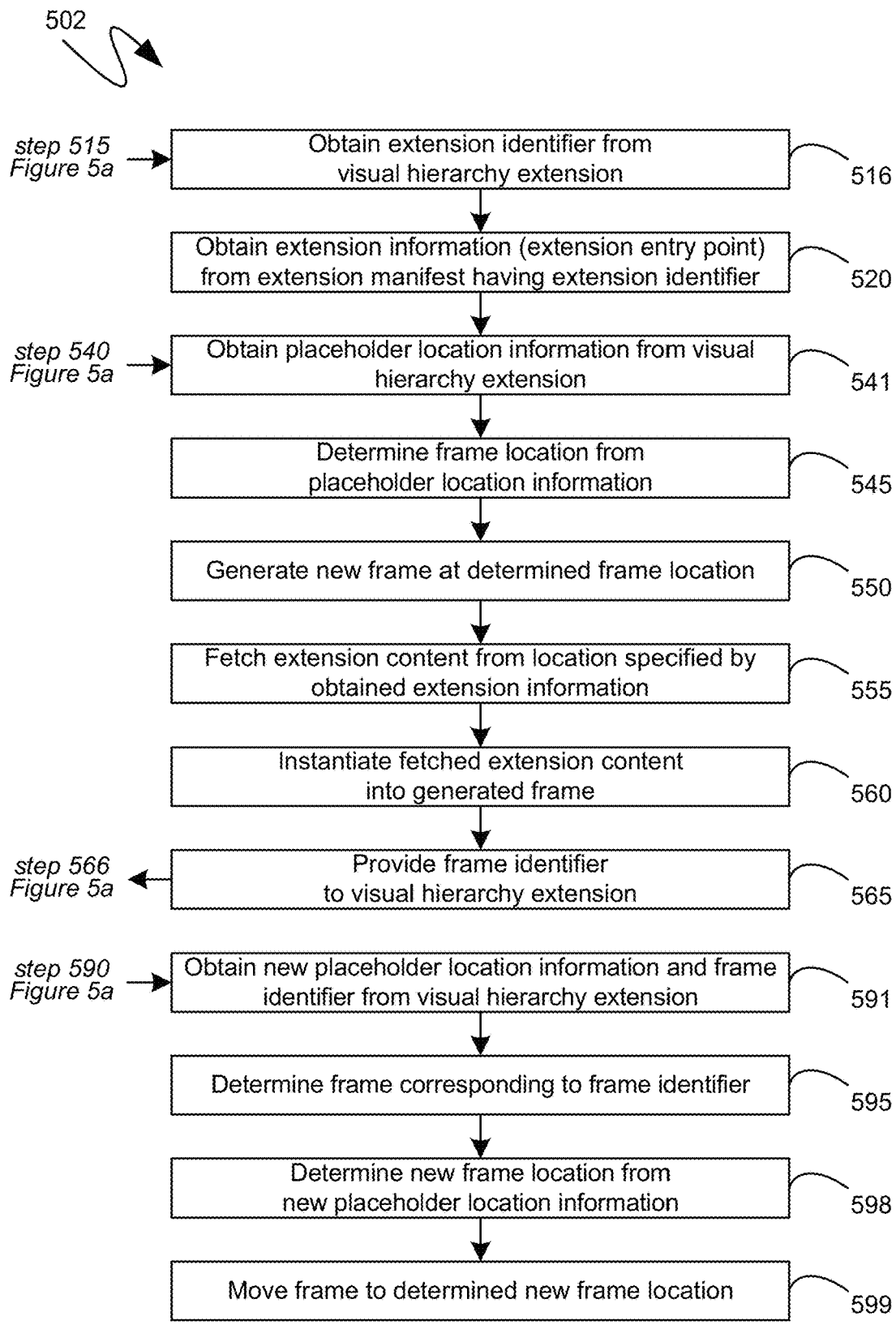

Turning to FIGS. 5*a* and 5*b*, the flow diagrams 501 and 502 shown therein illustrate an exemplary series of steps that, conceptually, are associated with a visual hierarchy simulation extension and a shell, but which are, in some instances, all be performed by a single browser application executing on a single computing device in accordance with computer executable instructions obtained from one or more modules, such as in the manner detailed above. Turning to the exemplary flow diagram 501 of FIG. 5*a*, a visual hierarchy simulation extension, as part of a webpage that represents the visual hierarchy simulation extension, includes, in some instances, a tag that triggers the creation of a placeholder element and specifies a corresponding extension utilizing an extension identifier. Upon encountering such a tag, at step 510, processing associated with the visual hierarchy simulation extension provides the extension identifier specified by the tag to the shell as illustrated by step 515. Processing then proceeds to step 516 shown in FIG. 5*b*, where processing associated with the shell obtains the extension identifier from the visual hierarchy simulation extension. Subsequently, at step 520, the obtained extension identifier is utilized to reference an extension manifest and obtain there from extension information, including an extension entry point by which an extension is invoked. As indicated previously, such an extension entry point is a URI, a URL, a table, or another like data structure that directly or indirectly identifies an extension.

Turning back to FIG. 5*a*, at step 525 the layout of the webpage of the visual hierarchy simulation extension is rendered in accordance with the document object model of such a webpage. As part of such a rendering, a placeholder is created at step 530 that corresponds to the tag encountered at step 510. At step 535, location information of the placeholder, rendered as part of step 530, is obtained, such as by utilizing the get bounding rectangle functionality of a web browser, or other like functionality. The obtained placeholder location information is then be provided to the shell at step 540.

Returning back to FIG. 5*b*, the placeholder location information is received from the visual hierarchy simulation extension at step 541. As indicated previously, the extension identifier received at step 516 and the placeholder location information received at step 541 have been transmitted and received together. At step 545, the location of a corresponding frame is determined based on such placeholder location information. As will be detailed further below, the determination of such frame location information entails, in some instances, adjusting for differences between a frame within whose reference the placeholder location information was obtained and a frame or window within whose reference the frame's location is being determined. As will also be further detailed below, the determination of such a frame location takes into account any clipping that may need to be implemented to align the frame with the placeholder. At step 550, since no frame identifier was received, a new frame is generated. Such a new frame is generated at the location determined at step 545. At step 555, the shell obtains extension content from the location specified by the extension information that was obtained at step 520. As indicated previously, such a location is directly or indirectly specified, allowing the identified extension to be changed, or selected at run-time. And at step 560, the obtained extension content is instantiated into the generated frame. An identifier of the generated frame is provided to the visual hierarchy simulation extension at step 565.

Turning back to FIG. 5*a*, the identifier of the generated frame is received at step 566. At step 570, the document object model of the webpage that represents the visual hierarchy simulation extension is searched to identify one or more parent document objects of such a placeholder. A determination is then be made, also as part of step 570, as to whether any one or more of those identified parent elements have overflow, such as in the manner detailed above. Additionally, at step 575, if appropriate, the scroll bars and other like overflow aspects of such one or more parent elements are monitored to detect visual changes to the parent elements that impact the placeholder. Steps 570 and 575 are directed to multiple levels of parent elements, or only the nearest hierarchical parent that has overflow. If changes are detected at step 580, such as, for example a resize or scroll event, then processing proceeds to step 585 and the location information of the placeholder again is performed, now obtaining its new location information subsequent to the event detected at step 580. Such information is then provided to the shell as part of a move request at step 590. According to one aspect, a move request entails the provision of information to the shell that includes both the new placeholder location information as well as the identifier of the corresponding frame, such as was received at step 566.

Turning back to FIG. 5*b*, the move request, comprising both the new placeholder location information as well as an identifier of the corresponding, overlaid frame, is received at step 591. Utilizing the frame identifier, the shell determines the corresponding frame at step 595. Similarly, in a manner analogous to that detailed above, and which will be further detailed below, a new frame location is determined from the new placeholder location information at step 598. At step 599, the frame determined at step 595 is moved to the new location determined at step 598. As detailed previously, in such a manner, the frame into which the content of an extension is being instantiated is resized in accordance with the resizing of the placeholder element, resulting in a visual presentation that makes it appear as if there are multiple hierarchical levels, even though the extensions can all be siblings of one another.

Figure 6:
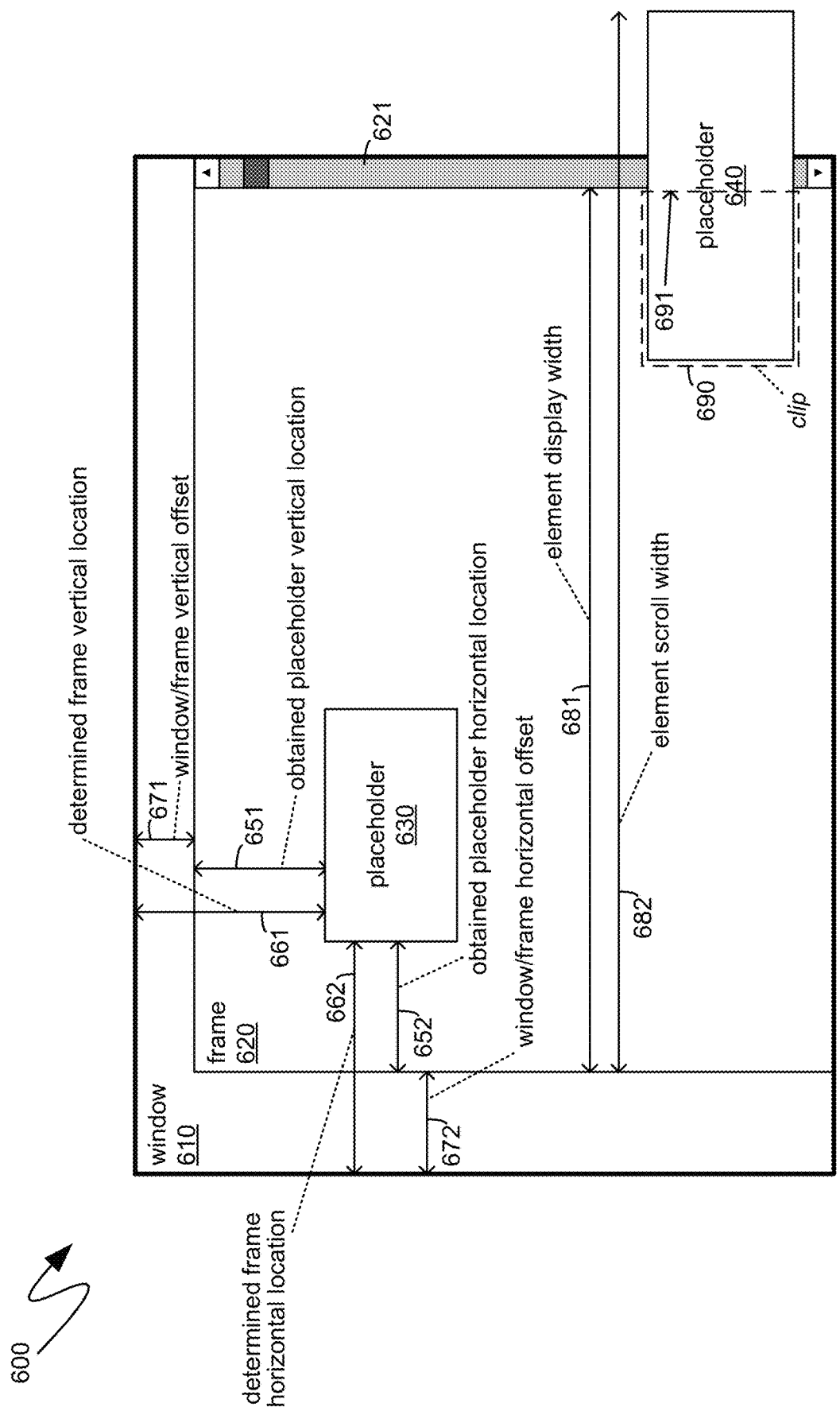
FIG. 6 is a system diagram of exemplary visual position determinations.

Turning to FIG. 6, the exemplary system 600 shown therein illustrates an exemplary frame location determination based upon obtained location information of a corresponding placeholder element. More specifically, and as one example, the placeholder 630 has location information that includes a vertical offset 651 and a horizontal offset 652. However, to the extent that the placeholder 630 is in a frame 620, the obtained location information 651 and 652, is provided, in some cases, with respect to the edges of the frame 620. By contrast, positioning of a frame to overlay the placeholder 630 is, in some instances, made with reference to a different context, such as a context of the window 610 of which the frame 620 may only be a part, or a sub-element thereof. Accordingly, in determining a location of an overlaying frame, account is made of the vertical offset 671 and the horizontal offset 672. For example, the horizontal location 662 of a frame to overlay the placeholder 630 is determined to be a sum of the obtained placeholder horizontal location 652 and the horizontal offset 672. Analogously, the vertical location 661 of a frame to overlay the placeholder 630 is determined to be a sum of the obtained placeholder vertical location 651 and the vertical offset 671.

By way of another example, a placeholder 640 is cut off by the size of the containing frame 620, and further by the scrollbars of such a containing frame, such as the exemplary scrollbar 621. The exemplary placeholder 640 is illustrated to represent how it would be as part of a traditional document object model rendering of the frame 620. By contrast, an overlaying frame, in some instances, needs to be clipped, such as in accordance with the mechanisms described herein. More specifically, existing functionality provides the relevant input data from which an appropriate clipping of an overlaying frame is determined. For example, an element scroll width 682 is obtained, which represents a distance to the edge of the placeholder 640, even if such an edge is not displayed as part of the document object model rendering of the frame 620. Additionally, an element display width 681 can also be obtained, with the element display width taking into account, and not extending into, the scrollbar 621. Accordingly, a difference between the element scroll width 682 and the element display width 681, in some instances, represents an amount by which, in some instances, a frame being overlaid over the placeholder 640 needs to be clipped. According to one aspect, a clip path is established, such as in the form of a rectangle, or other acceptable clip path shape, which, in some instances, clips the frame being overlaid over the placeholder 6402 the portion of the placeholder 640 that will be displayed as part of the document object model rendering of the frame 620. An exemplary clip path 690 is illustrated, with one edge of the clip path 690, namely the exemplary edge 691, being determined based on the above referenced difference between the element scroll width 682 and the element display width 681. In such a manner, the sizing and location of a frame is adjusted to visually simulate the frame as a hierarchical sub element, while allowing the extension whose content is being generated into the frame to remain at a same hierarchical level.

While the above descriptions have been directed to simulating a visual hierarchy utilizing frames of extensions that are at a same hierarchy by precisely overlaying each placeholder element with a corresponding frame, the descriptions provided are equally applicable if programmatic evaluations govern the overlaying of frames over placeholder elements. More specifically, according to one aspect, the overlaid frames is z-ordered according to programmatic evaluations, such as to prioritize displaying the visual overlays that contain a certain type of data, data of a certain quality, quantity or relevance, and other like programmatic evaluations. Alternatively, or in addition, frames comprising content that was not able to be retrieved, is stale, had rendering errors, or other like programmatic evaluations are deprioritized. Additionally, not every placeholder necessarily has a corresponding frame overlaid over it and the decision of whether to generate a frame for overlay over a placeholder can likewise be informed by programmatic evaluations. Conversely, placeholders are utilized as templates to enforce specified aspects, including visual aspects. For example, the fonts, colors, themes or other like stylistic aspects of the content displayed in overlaid frames are informed by, or controlled in accordance with instructions, specifications, limitations, or enumerations provided by the underlying placeholders.

Figure 7:
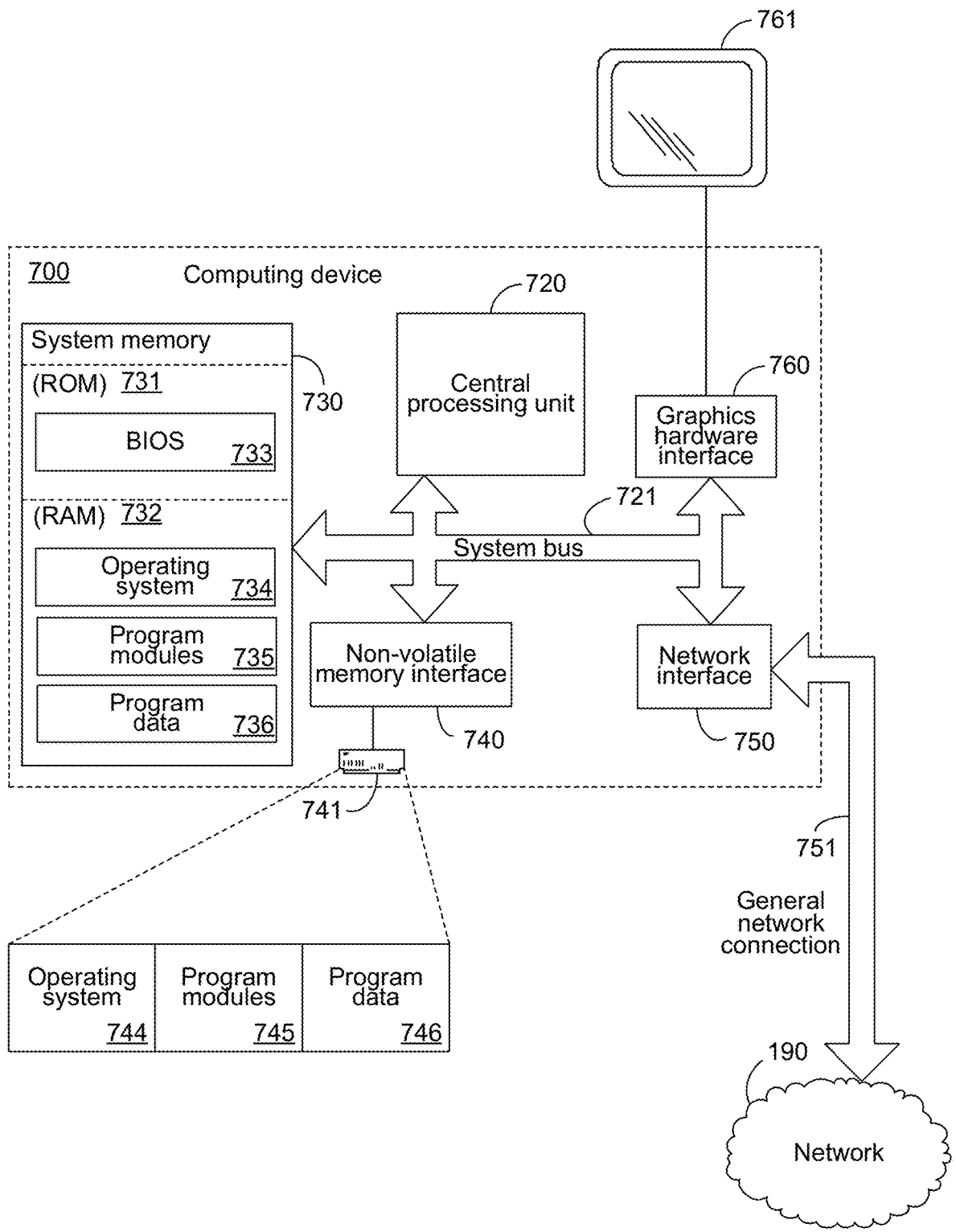
FIG. 7 is a block diagram of an exemplary computing device.

Turning to FIG. 7, an exemplary computing device 700 is illustrated which can perform some or all of the mechanisms and actions described above. The exemplary computing device 700 includes, but is not limited to, one or more central processing units (CPUs) 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. The computing device 700 can optionally include graphics hardware, including, but not limited to, a graphics hardware interface 760 and a display device 761, which includes display devices capable of receiving touch-based user input, such as a touch-sensitive, or multi-touch capable, display device. Depending on the specific physical implementation, one or more of the CPUs 720, the system memory 730 and other components of the computing device 700 can be physically co-located, such as on a single chip. In such a case, some or all of the system bus 721 can be nothing more than silicon pathways within a single chip structure and its illustration in FIG. 7 can be nothing more than notational convenience for the purpose of illustration.

The computing device 700 also typically includes computer readable media, which includes any available media that can be accessed by computing device 700 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 700. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer content between elements within computing device 700, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, other program modules 735, and program data 736.

The computing device 700 may also include other removable/non-removable, volatile/nonvolatile computer storage media. By way of example only, FIG. 7 illustrates a hard disk drive 741 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 741 is typically connected to the system bus 721 through a non-volatile memory interface such as interface 740.

The drives and their associated computer storage media discussed above and illustrated in FIG. 7, provide storage of computer readable instructions, data structures, program modules and other data for the computing device 700. In FIG. 7, for example, hard disk drive 741 is illustrated as storing operating system 744, other program modules 745, and program data 746. Note that these components can either be the same as or different from operating system 734, other program modules 735 and program data 736. Operating system 744, other program modules 745 and program data 746 are given different numbers hereto illustrate that, at a minimum, they are different copies.

The computing device 700 may operate in a networked environment using logical connections to one or more remote computers. The computing device 700 is illustrated as being connected to the general network connection 751 (to a network 752) through a network interface or adapter 750, which is, in turn, connected to the system bus 721. In a networked environment, program modules depicted relative to the computing device 700, or portions or peripherals thereof, may be stored in the memory of one or more other computing devices that are communicatively coupled to the computing device 700 through the general network connection 771. It will be appreciated that the network connections shown are exemplary and other means of establishing a communications link between computing devices may be used.

Although described as a single physical device, the exemplary computing device 700 can be a virtual computing device, in which case the functionality of the above-described physical components, such as the CPU 720, the system memory 730, the network interface 760, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 700 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a system comprising: a first computer-readable storage medium having stored thereon a module comprising instructions which, when executed by a browser application program in rendering a first webpage, cause the browser to: create a first placeholder as part of the rendering of the first webpage; obtain a first placeholder location of the first placeholder in the rendered first webpage; determine a first frame location based on the first placeholder location to visually overlay a first frame over the first placeholder; generate the first frame at the first frame location such that the first frame visually overlays the first placeholder; and render content from a second webpage in the first frame.

A second example is the system of the first example, wherein the rendering of the first webpage is in a second frame, the second frame being at a same document object model hierarchical level as the first frame.

A third example is the system of the first example, wherein when the instructions of the module are executed by the browser application program in rendering the first webpage, they further cause the browser to: create a second placeholder as part of the rendering of the first webpage, the second placeholder being hierarchically lower in a document object model of the first webpage than the first placeholder; obtain a second placeholder location of the second placeholder in the rendered first webpage; determine a second frame location based on the second placeholder location to visually overlay a second frame over the second placeholder; generate the second frame at the second frame location such that the second frame visually overlays the first placeholder; and render content from a third webpage in the second frame; wherein the second frame is at a same document object model hierarchical level as the first frame.

A fourth example is the system of the first example, wherein when the instructions of the module are executed by the browser application program in rendering the first webpage, they further cause the browser to: create a second placeholder as part of the rendering of the first webpage; obtain a second placeholder location of the second placeholder in the rendered first webpage; determine a second frame location based on the second placeholder location to visually overlay a second frame over the second placeholder; generate the second frame at the second frame location such that the second frame visually overlays the first placeholder; and render content from a third webpage in the second frame; wherein the browser chooses a z-order of the first frame and the second frame based on at least one of the content of the second webpage or the content of the third webpage.

A fifth example is the system of the first example, wherein when the instructions of the module are executed by the browser application program in rendering the first webpage, they further cause the browser to: obtain overflow information for a parent of the first placeholder; and monitor for an event changing a visual appearance of the parent, the monitoring being information by the obtained overflow information.

A sixth example is the system of the fifth example, wherein when the instructions of the module are executed by the browser application program in rendering the first webpage, they further cause the browser to: determine a new first placeholder location of the first placeholder subsequent to detecting the event changing the visual appearance of the parent; determine a new first frame location based on the new first placeholder location so as to continue to visually overlay the first frame over the first placeholder; and move the first frame to the new first frame location such that the first frame continues to visually overlay the first placeholder.

A seventh example is the system of the first example, wherein the determining the first frame location comprises adjusting the first placeholder location to account for differences between a first frame of reference within which the first placeholder location was obtained and a second frame of reference within which the first frame location will be utilized.

An eighth example is the system of the first example, wherein the determining the first frame location comprises setting a clip path to prevent display of at least a portion of the first frame.

A ninth example is the system of the first example, wherein the second webpage is specified at run-time.

A tenth example is the system of the first example, wherein the rendering of the content from the second webpage in the first frame is performed in accordance with stylistic instructions provided by the first placeholder, the stylistic instructions specifying at least one of: a font, a color or a visual theme.

An eleventh example is a method of simulating a multi-level visual hierarchy with outputs of web extensions that are at a same document object model hierarchical level, the method comprising: creating a first placeholder as part of a rendering of a first webpage comprising a tag invoking the creation of the first placeholder; obtaining a first placeholder location information of the first placeholder in the rendered first webpage; providing the first placeholder location information; and receiving, in response to the providing, a first frame identifier of a first frame that was overlaid over the first placeholder, the first frame having content of a second webpage rendered within the first frame, the second webpage being one of the web extensions.

A twelfth example is the method of the eleventh example, wherein the first webpage is rendered within a second frame, the first and second frames being at the same document object model hierarchical level.

A thirteenth example is the method of the eleventh example, further comprising: obtaining overflow information for a parent of the first placeholder; and monitoring for an event changing a visual appearance of the parent, the monitoring being information by the obtained overflow information.

A fourteenth example is the method of the thirteenth example, further comprising: obtaining a new first placeholder location information of the first placeholder subsequent to detecting the event changing the visual appearance of the parent; and providing the new first placeholder location information together with the first frame identifier.

A fifteenth example is the method of the eleventh example, further comprising: creating a second placeholder as part of the rendering of the first webpage, the first webpage comprising the tag invoking the creation of the second placeholder, the second placeholder being hierarchically lower in a document object model of the first webpage than the first placeholder; obtaining a second placeholder location of the second placeholder in the rendered first webpage; providing the second placeholder location information; and receiving, in response to the providing the second placeholder location information, a second frame identifier of a second frame that was overlaid over the second placeholder, the second frame having content of a third webpage rendered within the second frame, the third webpage also being one of the web extensions that are at the same document object model hierarchical level.

A sixteenth example is a method of simulating a multi-level visual hierarchy with outputs of web extensions that are at a same document object model hierarchical level, the method comprising: receiving a first placeholder location information of a first placeholder in a rendered first webpage; determining a first frame location based on the first placeholder location information to visually overlay a first frame over the first placeholder; generating the first frame at the first frame location such that the first frame visually overlays the first placeholder; and rendering content from a second webpage in the first frame, the second webpage being one of the web extensions.

A seventeenth example is the method of the sixteenth example, wherein the determining the first frame location comprises adjusting the first placeholder location information to account for differences between a first frame of reference within which the first placeholder location was obtained and a second frame of reference within which the first frame location will be utilized.

An eighteenth example is a method of the sixteenth example, wherein the determining the first frame location comprises setting a clip path to prevent display of at least a portion of the first frame.

A nineteenth example is the method of the sixteenth example, further comprising: receiving a second placeholder location information of a second placeholder in the rendered first webpage, the second placeholder being hierarchically lower in a document object model of the first webpage than the first placeholder; determining a second frame location based on the second placeholder location information to visually overlay a second frame over the second placeholder; generating the second frame at the second frame location such that the second frame visually overlays the second placeholder; and rendering content from a third webpage in the second frame, the third webpage being also being one of the web extensions that are at the same document object model hierarchical level.

A twentieth example is method of the nineteenth example, wherein the generating the second frame comprises generating only a portion of the second frame in accordance with a clip path, the generated portion of the second frame being overlaid over the first frame to visually appear as if the rendered content from the third webpage is visually hierarchically lower than the rendered content from the second webpage that is rendered in the first frame.

As seen from the above descriptions, mechanisms for providing a hierarchical visual paradigm while maintaining the communicational advantages of sibling extensions have been presented. In view of the many possible variations of the subject matter described herein, we claim as our invention all such embodiments as may come within the scope of the following claims and equivalents thereto.

We claim:

1. A system comprising:
   a first computer-readable storage medium having stored thereon instructions which, when executed by a browser application program in rendering a first webpage, cause the browser application program to:
   obtain a location of a first object in a rendered first webpage, the location of the first object having been determined by the rendering of the first webpage;
   generate a first frame at a first frame location corresponding to the obtained location of the first object such that the first frame visually overlays the first object, wherein generating the first frame comprises adjusting the location of the first object to account for differences between a first frame of reference within which the location of the first object was obtained and a second frame of reference within which the first frame will be utilized; and render content from a second webpage in the first frame.

2. The system of claim 1, wherein the rendering of the first webpage is in a second frame, the second frame being at a same document object model hierarchical level as the first frame.

3. The system of claim 1, wherein when the instructions are executed by the browser application program in rendering the first webpage, they further cause the browser application program to:

obtain a location of a second object in the rendered first webpage, the location of the second object having also been determined by the rendering of the first webpage, the second object being hierarchically lower in a document object model of the first webpage than the first object;

generate a second frame at a second frame location corresponding to the obtained location of the second object such that the second frame visually overlays the second object; and render content from a third webpage in the second frame; wherein the second frame is at a same document object model hierarchical level as the first frame.

4. The system of claim 1, wherein when the instructions are executed by the browser application program in rendering the first webpage, they further cause the browser application program to:

obtain a location of a second object in the rendered first webpage, the location of the second object having also been determined by the rendering of the first webpage, the second object being hierarchically lower in a document object model of the first webpage than the first object;

generate a second frame at a second frame location corresponding to the obtained location of the second object such that the second frame visually overlays the second object; and render content from a third webpage in the second frame; wherein the browser application program chooses a z-order of the first frame and the second frame based on at least one of the content of the second webpage or the content of the third webpage.

5. The system of claim 1, wherein when the instructions are executed by the browser application program in rendering the first webpage, they further cause the browser application program to:

obtain overflow information for a parent of the first object; and monitor for an event changing a visual appearance of the parent.

6. The system of claim 5, wherein when the instructions are executed by the browser application program in rendering the first webpage, they further cause the browser application program to:

determine a new location of the first object subsequent to detecting the event changing the visual appearance of the parent; and move the first frame to a new first frame location corresponding to the determined new location of the first object such that the first frame continues to visually overlay the first object.

7. The system of claim 1, wherein the generating the first frame comprises setting a clip path to prevent display of at least a portion of the first frame.

8. The system of claim 1, wherein the second webpage is specified at run-time.

9. The system of claim 1, wherein the rendering of the content from the second webpage in the first frame is performed in accordance with stylistic instructions provided by the first object, the stylistic instructions specifying at least one of: a font, a color or a visual theme.

10. A method of simulating a multi-level visual hierarchy with outputs of web extensions that are at a same document object model hierarchical level, the method comprising:

creating a first placeholder as part of a rendering of a first webpage comprising a tag invoking the creating of the first placeholder;

obtaining a first placeholder location information of the first placeholder in the rendered first webpage;

providing the first placeholder location information;

receiving, in response to the providing, a first frame identifier of a first frame that was overlaid over the first placeholder, the first frame having content of a second webpage rendered within the first frame, the second webpage being one of the web extensions;

obtaining overflow information for a parent of the first placeholder, and monitoring for an event changing a visual appearance of the parent, the monitoring being information by the obtained overflow information.

11. The method of claim 10, wherein the first webpage is rendered within a second frame, the first and second frames being at the same document object model hierarchical level.

12. The method of claim 10, further comprising:

obtaining a new first placeholder location information of the first placeholder subsequent to detecting the event changing the visual appearance of the parent; and providing the new first placeholder location information together with the first frame identifier.

13. The method of claim 10, further comprising:

creating a second placeholder as part of the rendering of the first webpage, the first webpage comprising the tag invoking the creating of the second placeholder, the second placeholder being hierarchically lower in a document object model of the first webpage than the first placeholder;

obtaining a second placeholder location information of the second placeholder in the rendered first webpage;

providing the second placeholder location information; and receiving, in response to the providing the second placeholder location information, a second frame identifier of a second frame that was overlaid over the second placeholder, the second frame having content of a third webpage rendered within the second frame, the third webpage also being one of the web extensions that are at the same document object model hierarchical level.

14. A method of simulating a multi-level visual hierarchy with outputs of web extensions that are at a same document object model hierarchical level, the method comprising:

obtaining a location of a first object in a rendered first webpage, the location of the first object having been determined by the rendering of the first webpage;

generating a first frame at a first frame location corresponding to the obtained location of the first object such that the first frame visually overlays the first object, wherein generating the first frame comprises adjusting the location of the first object to account for differences between a first frame of reference within which the location of the first object was obtained and a second frame of reference within which the first frame will be utilized; and rendering content from a second webpage in the first frame, the second webpage being one of the web extensions.

15. The method of claim 14, wherein the generating the first frame at the first frame location comprises setting a clip path to prevent display of at least a portion of the first frame.

16. The method of claim 14, further comprising:
obtaining location information of a second object in the rendered first webpage, the second object being hierarchically lower in a document object model of the first webpage than the first object, the location of the second object having also been determined by the rendering of the first webpage;

generating a second frame at a second frame location corresponding to the obtained location of the first object such that the second frame visually overlays the second object; and rendering content from a third webpage in the second frame, the third webpage being also being one of the web extensions that are at the same document object model hierarchical level.

17. The method of claim 16, wherein the generating the second frame comprises generating a portion of the second frame in accordance with a clip path, the generated portion of the second frame being overlaid over the first frame to visually appear as if the rendered content from the third webpage is visually hierarchically lower than the rendered content from the second webpage that is rendered in the first frame.

18. The method of claim 14, wherein the rendered first webpage is in a second frame, the second frame being at a same document object model hierarchical level as the first frame.

19. The method of claim 14, further comprising:
determining a new location of the first object subsequent to detecting an event changing a visual appearance of a parent of the first object; and moving the first frame to a new first frame location corresponding to the determined new location of the first object such that the first frame continues to visually overlay the first object.

* * * * *